United States Patent
Li et al.

(10) Patent No.: US 12,135,782 B2
(45) Date of Patent: Nov. 5, 2024

(54) SYSTEM, METHOD, AND PROGRAM FOR ANALYZING VEHICLE SYSTEM LOGS

(71) Applicant: The Boeing Company, Chicago, IL (US)

(72) Inventors: Mingyan Li, Bellevue, WA (US); Su-Nei Nina Shen, Mercer Island, WA (US); David S. Mier, Mercer Island, WA (US)

(73) Assignee: The Boeing Company, Arlington, VA (US)

( * ) Notice: Subject to any disclaimer, the term of this patent is extended or adjusted under 35 U.S.C. 154(b) by 221 days.

(21) Appl. No.: 17/826,285

(22) Filed: May 27, 2022

(65) Prior Publication Data

US 2023/0385405 A1 Nov. 30, 2023

(51) Int. Cl.
*G06F 21/55* (2013.01)
*G06F 16/28* (2019.01)

(52) U.S. Cl.
CPC .......... *G06F 21/552* (2013.01); *G06F 16/285* (2019.01); *G06F 2221/034* (2013.01)

(58) Field of Classification Search
CPC . G06F 21/552; G06F 16/285; G06F 2221/034
USPC .......................................................... 726/23
See application file for complete search history.

(56) References Cited

U.S. PATENT DOCUMENTS

| | | | |
|---|---|---|---|
| 9,407,649 B2 | 8/2016 | Honda et al. | |
| 9,602,529 B2 | 3/2017 | Jones et al. | |
| 9,860,278 B2 * | 1/2018 | Kurakami | H04L 43/04 |
| 10,659,477 B2 * | 5/2020 | Choi | H04L 63/1441 |
| 10,673,880 B1 * | 6/2020 | Pratt | H04L 63/1425 |
| 10,820,196 B2 | 10/2020 | Nguyen et al. | |
| 10,824,647 B2 * | 11/2020 | Lecue | G06Q 10/04 |
| 11,019,088 B2 | 5/2021 | Pratt et al. | |
| 11,055,319 B2 * | 7/2021 | Ensberg | G06F 16/2228 |

(Continued)

FOREIGN PATENT DOCUMENTS

EP 3 503 498 6/2019

OTHER PUBLICATIONS

Min Du et al: "DeepLog: Anomaly Detection and Diagnosis from System Logs through Deep Learning," School of Computing, University of Utah.

(Continued)

*Primary Examiner* — Badrinarayanan
*Assistant Examiner* — Badri Champakesan
(74) *Attorney, Agent, or Firm* — Walters & Wasylyna LLC

(57) ABSTRACT

A system includes a processor and a storage device containing instructions. Execution of the instructions causes the processor to: (1) connect with an onboard system of a vehicle, wherein the onboard system is connectable to a network; (2) collect an activity log generated by the onboard system, wherein the activity log includes log messages indicative of an activity of the onboard system; (3) extract a feature list from the activity log, wherein the feature list includes features and each one of the features includes select information from a corresponding one of the log messages; (4) extract an episode from the feature list, wherein the episode is indicative of the activity of the onboard system; and (5) classify the episode with an episode classification, wherein the episode classification is indicative of an event that occurred during the activity.

20 Claims, 13 Drawing Sheets

(56) References Cited

U.S. PATENT DOCUMENTS

| | | | |
|---|---|---|---|
| 11,146,578 B2 | 10/2021 | Lem et al. | |
| 11,243,959 B1* | 2/2022 | Gilboa | G06F 16/285 |
| 11,603,110 B2* | 3/2023 | Rodriguez Bravo | G01D 18/00 |
| 11,615,183 B2* | 3/2023 | Ito | G06F 21/54 |
| | | | 726/23 |
| 2017/0369190 A1 | 12/2017 | Ethington et al. | |
| 2020/0311263 A1* | 10/2020 | Riviere | G06F 11/3013 |
| 2021/0226974 A1* | 7/2021 | Hirano | G06F 11/3079 |
| 2021/0319045 A1* | 10/2021 | Iserson | G06F 16/2456 |
| 2023/0259632 A1* | 8/2023 | Marciano | G06F 21/577 |
| | | | 726/25 |

OTHER PUBLICATIONS

Vaarandi et al: " LogCluster- A Data Clustering and Pattern Mining Algorithm for Event Logs," TutCentre for Digital Forensics and Cyber Security, Tallin University of Technology.

European Patent Office, Extended European Search Report, App. No. 23161771.3 (Oct. 10, 2023).

\* cited by examiner

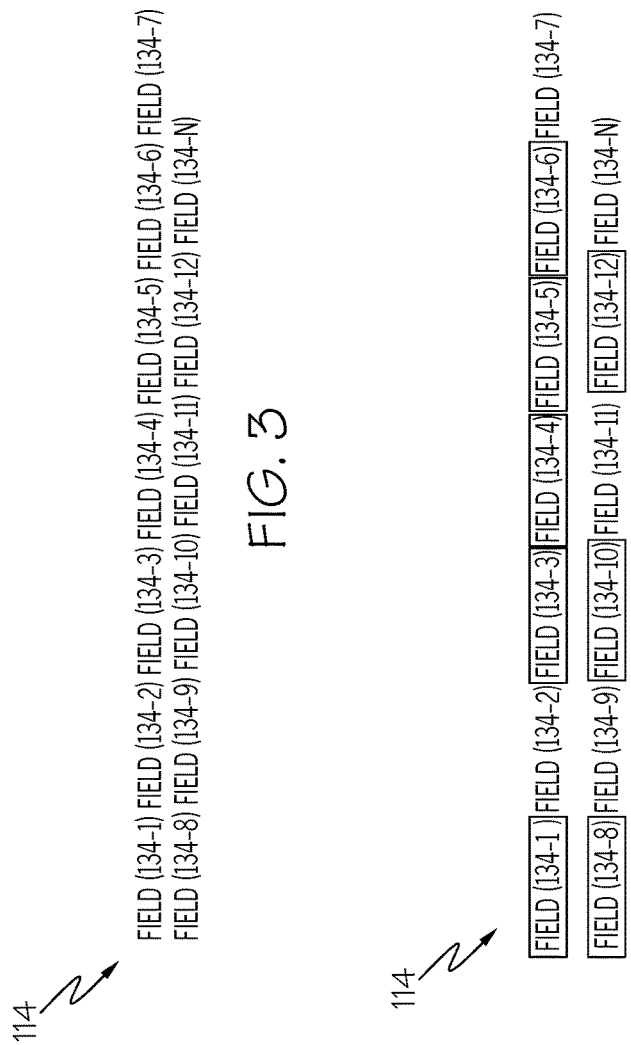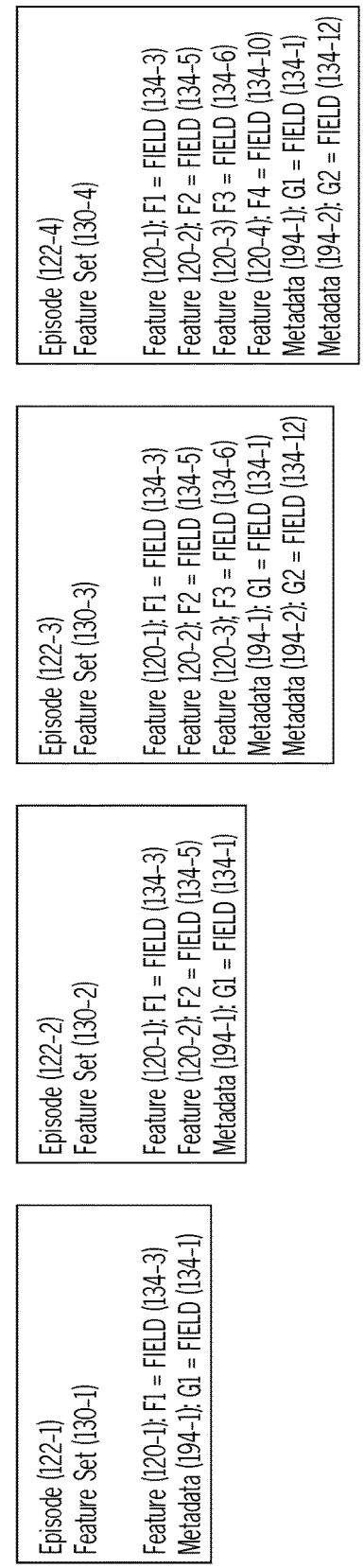
FIG. 3
FIG. 4

SYSTEM, METHOD, AND PROGRAM FOR ANALYZING VEHICLE SYSTEM LOGS

FIELD

The present disclosure relates generally to cybersecurity log analysis and, more particularly, to a system, method, and program employing analytical techniques for vehicle system log analysis and profiling.

BACKGROUND

Many modern vehicles, such as aircraft, are heavily "e-Enabled." Generally, e-enabled vehicles utilize a suitable communication protocol to interconnect one or more systems. Such systems may generate an extremely large amount of log data, which contain critical security and health information related to the vehicle systems. Proper understanding and usage of this information leads to effective situational awareness. Failure to understand this information may result in cybersecurity compromises. However, new types, formats, and content are constantly being introduced into security logs. As such, the ability to quickly and accurately profile and analyze rapidly evolving log data to detect anomalies and cybersecurity threats is becoming increasingly difficult. Accordingly, those skilled in the art continue with research and development efforts in the field of system log management and analysis.

SUMMARY

Disclosed are examples of a system for analyzing vehicle system logs, a method for analyzing vehicle system logs, a program for analyzing vehicle system logs. The following is a non-exhaustive list of examples, which may or may not be claimed, of the subject matter according to the present disclosure.

In an example, the disclosed system includes a processor and a storage device containing instructions. Execution of the instructions causes the processor to: (1) connect with an onboard system of a vehicle, wherein the onboard system is connectable to a network; (2) collect an activity log generated by the onboard system, wherein the activity log includes log messages indicative of an activity of the onboard system; (3) extract a feature list from the activity log, wherein the feature list includes features and each one of the features includes select information from a corresponding one of the log messages; (4) extract an episode from the feature list, wherein the episode is indicative of the activity of the onboard system; and (5) classify the episode with an episode classification, wherein the episode classification is indicative of an event that occurred during the activity.

In an example, the disclosed method includes steps of: (1) connecting to an onboard system of a vehicle, wherein the onboard system is connectable to a network; (2) collecting an activity log from the onboard system, wherein the activity log includes log messages indicative of an activity of the onboard system; (3) extracting a feature list from the activity log, wherein the feature list includes features and each one of the features includes select information from a corresponding one of the log messages; (4) extracting an episode from the feature list, wherein the episode is indicative of the activity of the onboard system; and (5) classifying the episode with an episode classification, wherein the episode classification is indicative of an event that occurred during the activity.

In an example, the disclosed program includes a non-transitory computer readable medium, containing instructions that cause a processor to execute a process including: (1) collecting an activity log from an onboard system of a vehicle, wherein the activity log includes log messages indicative of an activity of the onboard system; (2) extracting a feature list from the activity log, wherein the feature list includes features and each one of the features includes select information from a corresponding one of the log messages; (3) extracting an episode from the feature list, wherein the episode is indicative of the activity of the onboard system; and (4) classifying the episode with an episode classification, wherein the episode classification is indicative of an event that occurred during the activity.

Other examples of the disclosed system, method, and program will become apparent from the following detailed description, the accompanying drawings, and the appended claims.

BRIEF DESCRIPTION OF THE DRAWINGS

FIG. 3 illustrates an example of a log message of the activity log;

FIG. 4 illustrates an example of features designated from the log message shown in FIG. 3;

DETAILED DESCRIPTION

Referring generally to FIGS. 1-12, the present disclosure is directed to examples of a method 1000 for analyzing vehicle system logs (e.g., a log analysis method), a system 100 for analyzing vehicle system logs (e.g., a log analysis system), and a computer program 188 (e.g., a computer implemented program product) for analyzing vehicle system logs (e.g., a log analysis program). Examples of the system 100 and/or the program 188 enable implementation of the method 1000 within a computing environment.

Figure 11:
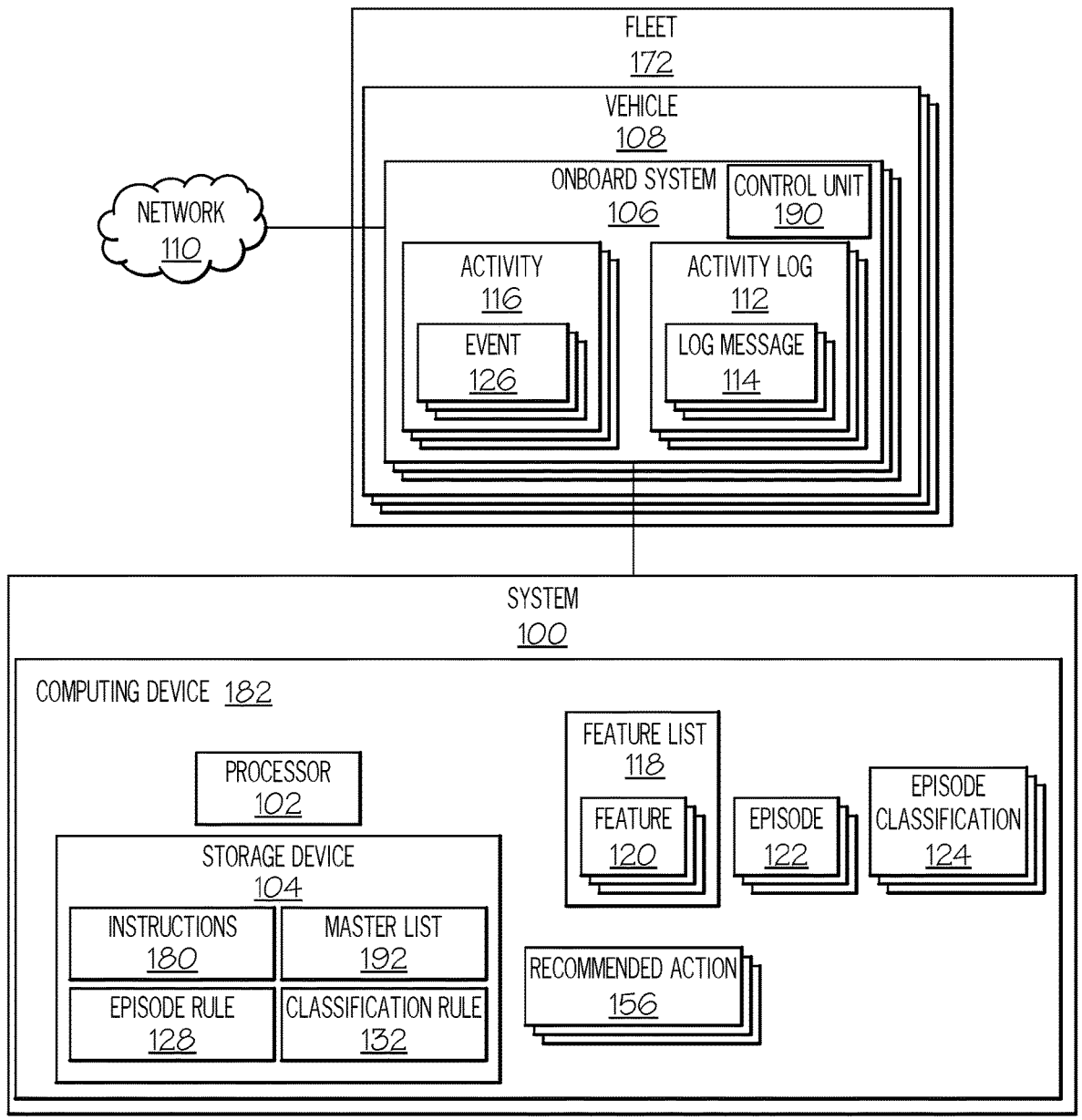
FIG. 11 is a schematic block diagram of an example of a system for analyzing vehicle system logs.
Figure 14:
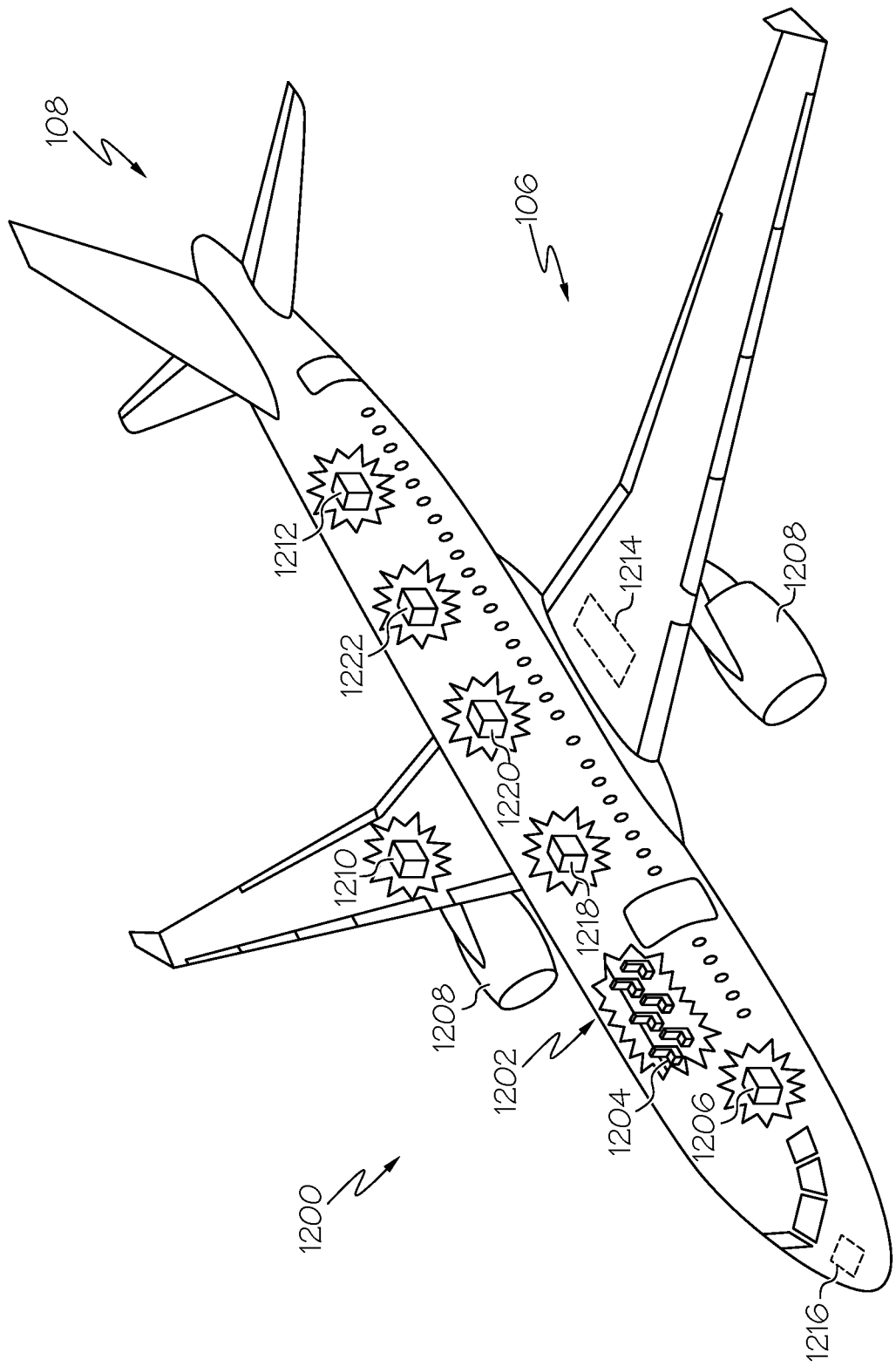
FIG. 14 is a schematic illustration of an example of an aircraft.

Examples of the method 1000 (e.g., shown in FIG. 1), the system 100 (e.g., shown in FIG. 11), and the program 188 (e.g., shown in FIG. 12) are described herein with respect to a vehicle 108 (e.g., as shown in FIG. 11), such as an aircraft 1200 (e.g., as shown in FIG. 14). However, it should be understood that the examples of method 1000, system 100, and program 188 can be implemented or deployed with any suitable vehicle 108 that includes one or more network connectable vehicle systems that produce activity logs, such as, but not limited to, aerospace vehicles, rotary wing aircraft, unmanned aerial vehicles (UAVs), fixed wing aircraft, lighter than air vehicles, maritime vehicles, and automotive vehicles.

Referring initially to FIG. 11, which illustrates an example of the vehicle 108, including at least one onboard system 106, and the system 100 for managing at least one activity log 112 produced by at least the one onboard system 106. In one or more examples, the vehicle 108 includes a plurality of the onboard systems 106. Each one of the onboard systems 106 includes one or more respective components, such as control components and operating components.

In one or more examples, one or more of the onboard systems 106 includes a control unit 190 that utilizes a computer-implemented or computer-controlled operating system. One or more of the onboard systems 106 is configured to be connected to and to communicate with a network 110. Additionally, one or more of the onboard systems 106 is also configured to be connected to and to communicate with another one or more of the onboard systems 106. Connection of any one of the onboard systems 106 with the network 110 or another one of the onboard systems 106 is continuous or intermittent (e.g., at predetermined times or during specific activities). In some examples, connectability of the onboard systems 106 can leave the onboard systems 106 vulnerable to a cybersecurity threat.

Referring briefly to FIG. 14, which illustrates an example of the aircraft 1200. In one or more aerospace examples, the onboard systems 106 of the aircraft 1200 include avionics systems 1206, propulsion systems 1208, hydraulic systems 1210, electrical systems 1212, main landing gear systems 1214, nose landing gear systems 1216, environmental systems 1218, and communications systems 1220. The aircraft 1200 also includes an airframe 1202 having an interior 1204. In other examples, the onboard systems 106 also includes one or more control systems 1222 coupled to an airframe 1202 of the aircraft 1200, such as for example, flaps, spoilers, ailerons, slats, rudders, elevators, and trim tabs. In yet other examples, the onboard systems 106 also includes one or more other systems, such as, but not limited to, software distribution systems, network communications systems, passenger information/entertainment systems, guidance systems, radar systems, weapons systems, and the like. One or more of the onboard systems 106 includes at least one associated system control unit 190 (e.g., as shown in FIG. 11). In some examples, the system control unit 190 can be susceptible to a cyber-attack. As such, collective reference to the onboard systems 106 and individual reference to an onboard system 106 herein are intended to be inclusive of any of the system control unit(s) 190 associated with one or more of the respective onboard systems 106.

The present disclosure recognizes that an increasing number of the onboard systems 106 of vehicles 108, such as the aircraft 1200, is continually or intermittently connected to the communication network 110 (e.g., an Internet/cloud-based communication network). For example, "e-Enabled" aircraft include highly integrated interconnected software and firmware driven computer systems with specific real-time computing and control tasks. Data links in-flight and on-ground transfer and receive critical control, navigation, operations, and maintenance information. Generally, an e-Enabled vehicle can use Transmission Control Protocols (TCP) and/or Internet Protocols (IP), or any other suitable communication protocol, to interconnect one or more of the onboard systems 106 in a manner that virtually makes the vehicle 108 an interconnected network domain server. Due to, for example, the increased reliance on the onboard systems 106 being connected to the network 110, the vehicle 108 can face potential cyber-attacks including, for example, but not limited to zero-day attacks, denial of service, sophisticated/advanced persistent malware, structured query language (SQL) injection attacks, session hijacking and man-in-the-middle attacks, network probing, brute-force cracking, ransomware, and insider threats.

The onboard systems 106 of the vehicle 108 produce activity logs 112 (e.g., system log data) that capture a variety of information, such as, but not limited to, system health, data load, file service, network messages, network performance, communication status, security events, and the like. In one or more examples, the activity logs 112 (e.g., audit trail records, event logs, transaction logs, message logs, server logs, security logs, etc.) generated by onboard systems 106 document activities 116 of the onboard systems 106 and include a collection of security related messages that provide an opportunity to identify security risks of the vehicle 108.

Log analysis is the evaluation of the activity logs 112 and is used to mitigate a variety of risks, to understand and respond to cybersecurity incidents, to conduct root cause investigations in response to an incident, and/or to comply with regulations or security policies. Generally, the activity logs 112 include a plurality of log messages 114 that are chronologically arranged and stored, for example, on a disk, in files, or in an application like a log collector. Each one of the log messages 114 contains information related to a specific activity 116 within the onboard system 106. Many of the log messages 114 contain information related to security. As examples, the activity logs 112 (e.g., security logs) are generated by security software, operating systems, and applications of the onboard systems 106.

The present disclosure also recognizes that the number, volume, and variety of activity logs 112 have greatly increased, which has created the need for improvements in log management and analysis. For example, each aircraft 1200 in a fleet 172 generates anywhere from 1 gigabyte (GB) to 8 gigabytes of log data over the course of a year of service. Additionally, the log messages 114 of the activity logs 112 are generally recorded in text log message format that provides a description of relevant activities 116 and events 126, rather than network traffic data. Typically, network traffic data is used by conventional cyber-attack infrastructure defenses and conventional cyber-attack infrastructure defenses generally are not capable of analyzing the text of the log messages 114.

Examples of the method 1000, the system 100, and the program 188 facilitate efficient profiling and analyzing of the activity logs 112. More particularly, examples of the method 1000, the system 100, and the program 188 enable raw data (e.g., text) contained in the log messages 114 of the activity logs 112 to be parsed and formatted to extract select data related to or relevant to the activity 116 of the onboard system 106 of the vehicle 108. Examples of the method 1000, the system 100, and the program 188 further enable sets or groups of the selected data to be classified, which indicate an event 126 associated with the activity 116. Accordingly, examples of the method 1000, the system 100, and the program 188 enable detection and identification of the onboard system 106 that is vulnerable to or that is a target of a cybersecurity threat or attack from among a plurality of onboard systems 106 and/or from among a plurality of vehicles 108.

For the purpose of the present disclosure, the term "activity" (e.g., activity 116) refers to and includes an action and/or function associated with (e.g., performed by, with, or on) the onboard system 106. As examples, the onboard system 106 is configured to perform any one of various types of computer-implemented activities, such as data load activities, network communication activities, software staging activities, network and system startup activities, identity confirmation activities, software installation or deletion activities, certificate validation activities, file request operations, and the like. The term "event" (e.g., event 126) refers to a particular type or task of the activity 116, such as a particular operation, process, communication, and/or response occurring during performance of the activity 116. As an example, the activity 116 includes one or more events 126, such as initiation of an operation (e.g., loading, staging, installing, deleting, communicating, validating, etc.), a successful operation, a failed operation, a timed out operation, an error in performing the operation, termination of an operation, and the like. In other words, the event 126 is what happens during performance of an activity 116.

The log messages 114 of the activity log 112 provide a record of the activities 116 and the events 126 that occur in the operating system of the onboard system 106. For the purpose of the present disclosure, the term "episode" (e.g., episode 122) refers to a description or characterization of an instance of the activity 116 as indicated by analysis of a number of log messages 114 in the activity log 112. For example, the episode 122 is a filtered segment of the activity log 112 that represents a specific function of the onboard system 106 of the vehicle 108. Further, the episode 122 is a subset of multiple log messages 114 selected from the activity log 112. For example, the episode 122 that characterizes of described a data load activity will only contain log messages 114 that are related to data load and will filter out other log messages 114 that are generated throughout the duration of the data load activity and that are not related to the data load activity itself. The activity 116 can be characterized by any number of episodes 122 depending, for example, on a level of specificity to which the episode 122 characterizes the activity 116. The term "episode classification" (e.g., episode classification 124) refers to a description or characterization of an instance of the event 126 occurring during the activity 116 as indicated by analysis of the number of log messages 114.

The disclosed method 1000, system 100, and program 188 enable converting and mapping the log messages 114 into log features, referred to herein as features 120, a combination of which characterize a particular type of activity 116 performed by the onboard system 106. As will be described in more detail herein, the log features consist of an extraction of key terms (e.g., words) and/or values that represent semantic content embedded within the log messages 114. The frequency, rate, and/or patterns of the log features provide cues related to behavior of the onboard systems 106 and, as such, serve as the basis for profiling and analyzing the log messages 114 to detect anomalies and cybersecurity incidents. The disclosed method 1000, system 100, and program 188 enable automation to at least portions of the profiling and analyzing process. As an example, the disclosed method 1000, system 100, and program 188 enable automatic profiling and categorizing the log messages 114 as various types of episodes 122. As another example, the disclosed method 1000, system 100, and program 188 enable creation of new types of episodes 122 and episode classifications 124 when new types and/or formats of data in the log messages 114 are introduced.

Accordingly, examples of the method 1000, the system 100, and the program 188 apply analytical techniques to identify the events 126 that are frequently occurring and/or the events 126 that are rarely occurring (e.g., outlying events) from the textual log data of the log messages 114. Identification of an occurrence (or rate of occurrence) of any one of the events 126 provides an indication that a mitigation act or remediation act may be needed in response to the event 126.

Figure 1:
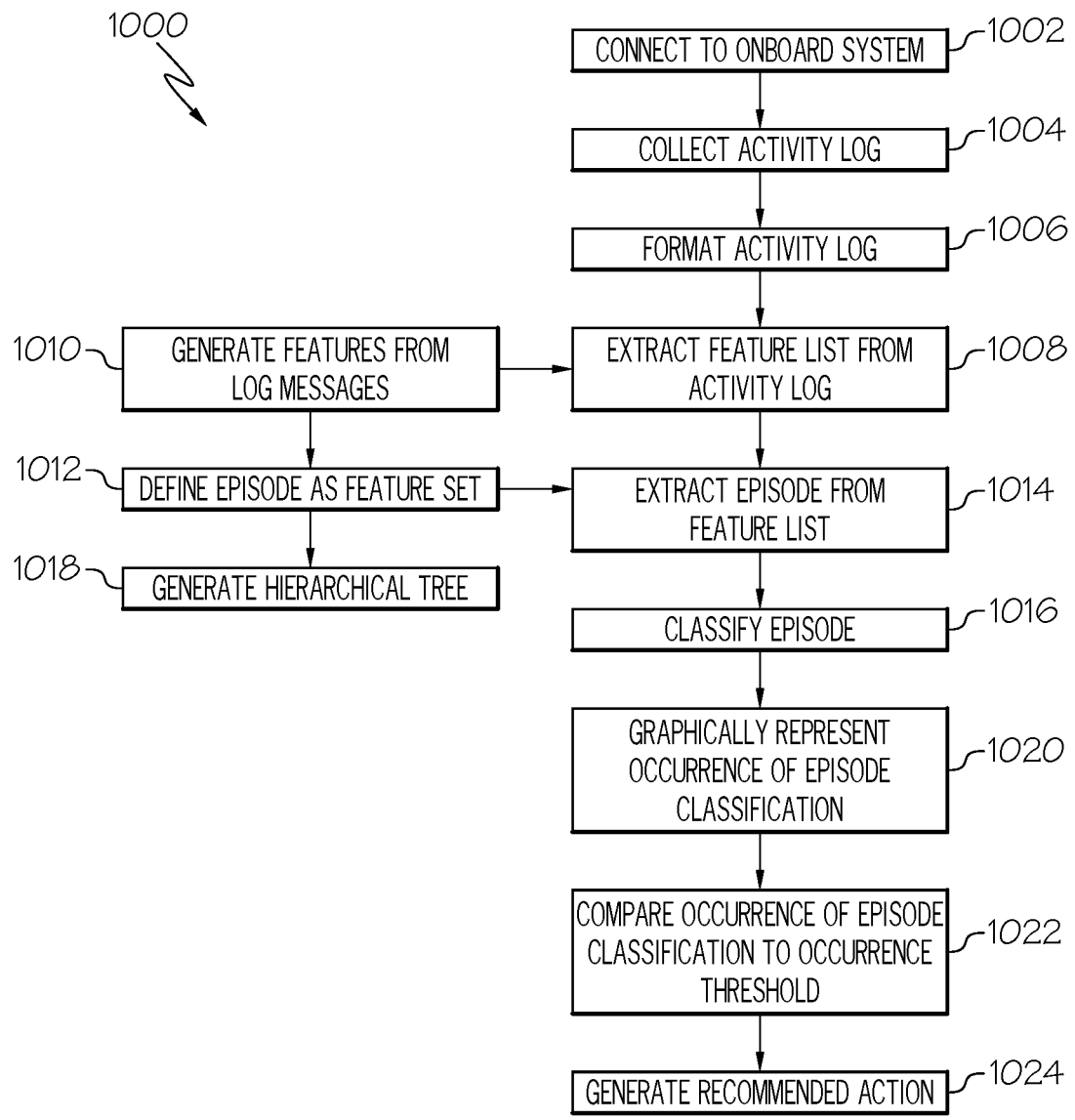
FIG. 1 is a flow diagram of an example of a method for analyzing vehicle system logs.
Figure 2:
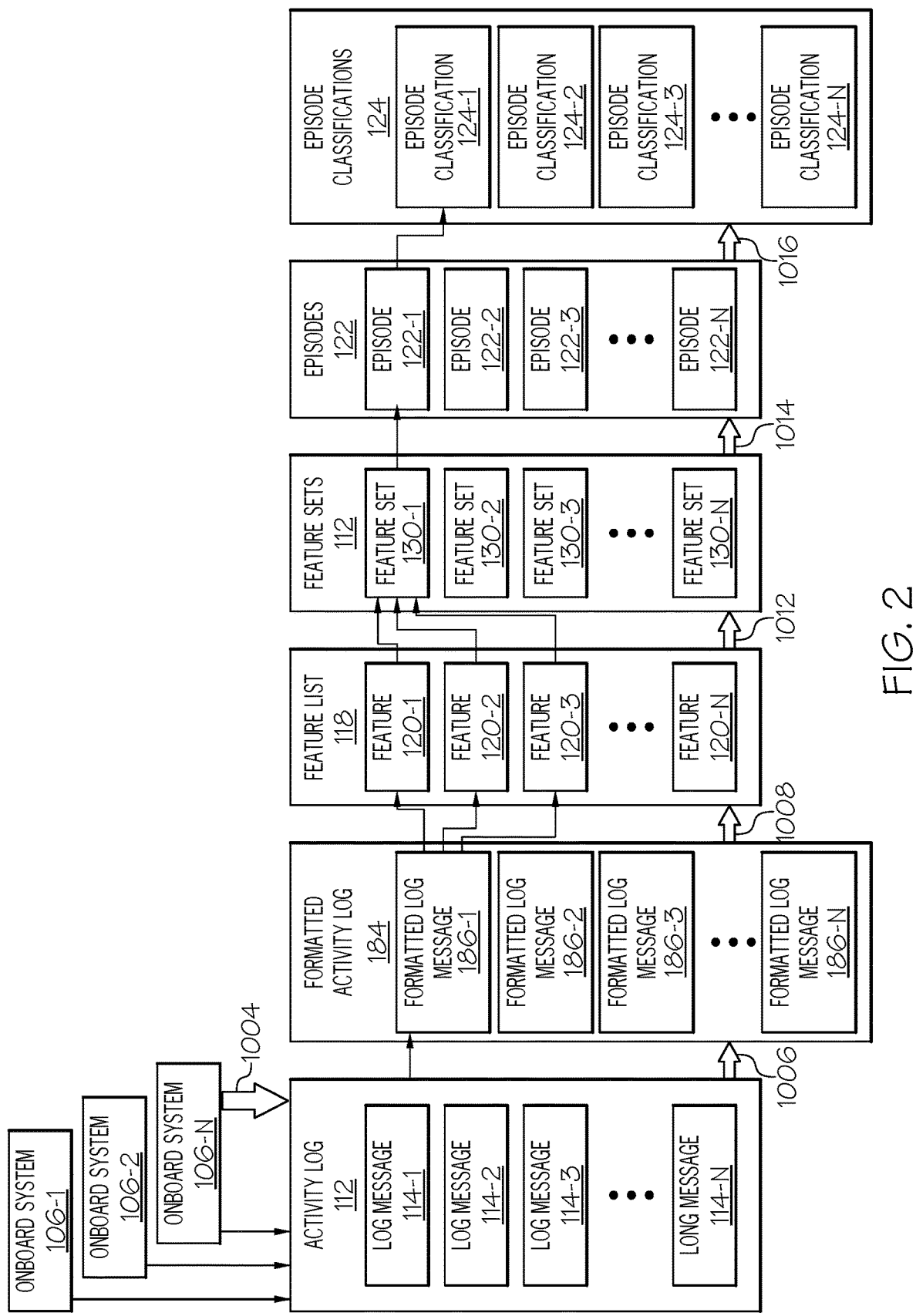
FIG. 2 is a block diagram of an example of a process for generating episode classifications from an activity log.

Referring now to FIGS. 1 and 2, which illustrate examples of a process for managing (e.g., profiling and classifying) the activity log 112 for analysis. This process provides context to the activity 116 performed by the onboard system 106 of the vehicle 108 and enables analysis of the activity log 112.

Figure 13:
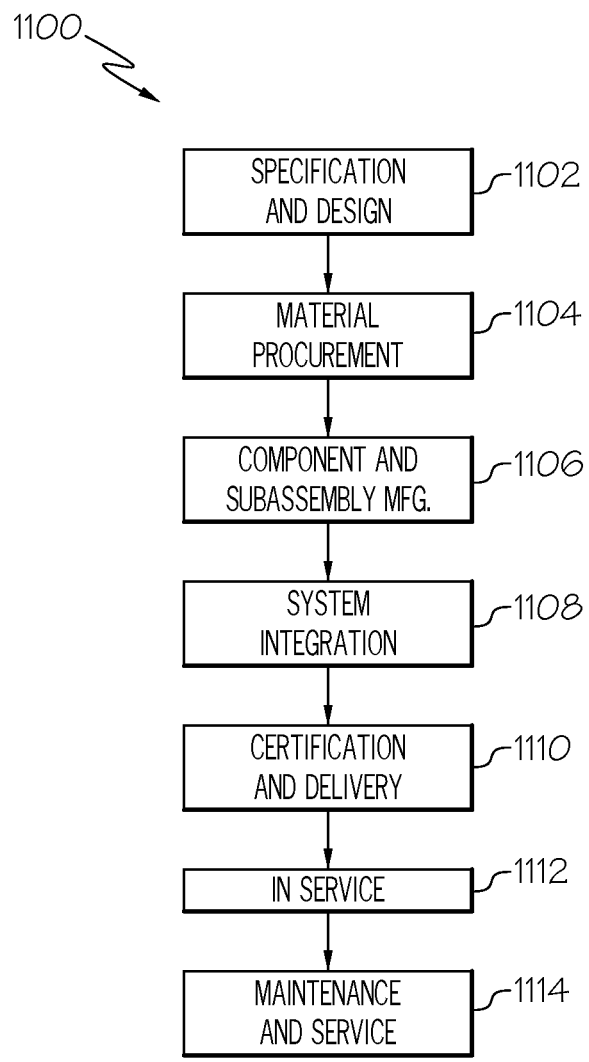
FIG. 13 is a flow diagram of an example aircraft service method.

In one or more examples, the method 1000 includes a step of (block 1002) connecting to the onboard system 106 of the vehicle 108. The onboard system 106 is connectable (e.g., is connected or is configured to be connected) to the network 110 (e.g., as shown in FIG. 13). The onboard system 106 is also connectable (e.g., is connected to or is configured to be connected to) the system 100 (e.g., as shown in FIG. 2), for example, directly or via the network 110.

In one or more examples, the method 1000 includes a step of (block 1004) collecting the activity log 112 (e.g., at least one of the activity logs 112) from the onboard system 106. The activity log 112 includes the log messages 114 that are indicative of the activity 116 of the onboard system 106. Generally, the activity log 112 (e.g., one or more of the activity logs 112) is collected from the onboard system 106 (e.g., one or more of the onboard systems 106). As an example, the system 100 (e.g., as shown in FIG. 13) collects the log messages 114 of the activity log 112 directly from the onboard system 106 (e.g., from the control unit 190). As another example, the system 100 collects the activity log 112 from a stored location or another application (e.g., a log collector).

In one or more examples, the activity log 112 includes the log messages 114 generated by one of the onboard systems 106 over a certain period of time (e.g., one day, one month, one year, etc.), which may also be referred to as a system log history. In other examples, the activity log 112 includes the log messages 114 generated by more than one of the onboard systems 106 (e.g., onboard system 106-1, onboard system 106-2, onboard system 106-N shown in FIG. 2) over a certain period of time, which may also be referred to as a vehicle systems log history. In other examples, the activity log 112 includes the log messages 114 generated by more than one of the onboard systems 106 of more than one vehicle 108 (e.g., from the fleet 172 of vehicles 108) over a certain period of time, which may also be referred to as a fleet systems log history. Examples of the activity logs 112 include, but are not limited to, center for internet security (CIS) logs, copy services manager (CSM) logs, network interface module (NIM) logs, and any other system logs.

The activity log 112 includes any number of the log messages 114 (e.g., log message 114-1, log message 114-2, log message 114-3, log message 114-N shown in FIG. 2). Generally, each log message 114 contains textual log data (e.g., text). In some examples, the textual log data of the log message 114 is without a well-defined structure. In some examples, the activity log 112 includes an extremely large amount of textual log data (e.g., multiple gigabytes of text), for example, log messages 114 from many onboard systems 106 of many vehicles 108. In one or more examples, the activity log 112 refers to a raw log in which the textual log data of the log messages 114 is unmodified before extraction of the feature list 118 from the activity log 112. However, in other examples (e.g., as shown in FIG. 2), the activity log 112 is pre-processed to provide a formatted activity log 184 before extraction of the feature list 118.

In one or more examples, the method 1000 includes a step of (block 1006) formatting or otherwise pre-processing the activity log 112. In these examples, the feature list 118 is extracted from formatted log messages 186 of the formatted activity log 184. As an example, the log messages 114 are formatted or otherwise processed to provide the formatted log messages 186 (e.g., formatted log massage 186-1, formatted log massage 186-2, formatted log massage 186-3, formatted log massage 186-N shown in FIG. 2). Formatting or processing of the log messages 114 (e.g., raw log massages) to the formatted log message 186 prepares the textual log data for analysis, such as by removing fields of text that are not needed, not utilized, or not associated with the activity 116, standardizing the date and time of the log message 114, labelling the log message 114 with the source of the log message 114 (e.g., the corresponding onboard system 106), filtering the contents of the textual log data (e.g., removing spaces, punctuation, non-standard or free-form text, etc.), and the like.

As examples, pre-processing the log messages 114 includes filtering out arbitrary values and/or parameters contained in the text of the log message 114 for the purpose of obtaining the core and invariant content of the log message 114. As examples, various analysis context-irrelevant information, such as timestamps, punctuation, and parameters (e.g., text behind an "=" or ":") are removed. In one or more examples, pre-processing of the log messages 114 utilizes domain knowledge (e.g., of the vehicle 108 and the onboard system 106) and/or subject matter experts to remove only context-irrelevant information and leave pertinent information, such as IP addresses, ports, web service status codes, and vehicle services names, which consist of a mixture of text (e.g., letters and digits).

As an example, prior domain knowledge is used to identify a set of digits, letters, and/or patterns that are particular to a specific vehicle 108 and/or onboard system 106. As such, these system log messages are pre-processed differently from a generic filtering operation. For example, some IP addresses are converted to text, such as names of different onboard systems 106 or non-vehicle addresses, according to a knowledge-based mapping list.

In one or more examples, the method 1000 includes a step of (block 1008) extracting a feature list 118 from the activity log 112. The feature list 118 is extracted or otherwise generated from the log messages 114 of the activity log 112 or, alternatively, the formatted log messages 186 of the formatted activity log 184. The feature list 118 includes a number of the features 120 (e.g., feature 120-1, feature 120-2, feature 120-3, feature 120-N as shown in FIG. 2). In one or more examples, the feature list 118 includes a chronological list of the features 120 that have been extracted, generated, or defined from the log messages 114 of the activity log 112 over a predetermined period of time (e.g., the log history). In one or more examples, each one of the features 120 includes a timestamp, a numerical feature identification (e.g., F1, F2, F3, FN) and at least one field of text, referred to herein as a field 134, from one of the log messages 114.

In one or more examples, the method 1000 includes a step of (block 1010) generating (e.g., defining or designating) the features 120. In one or more examples, the features 120 are defined prior commencement of the log analysis process of the activity log 112. In one or more examples, the features 120 are designated or otherwise selected from any suitable source, such as current log messages or historical log messages. In one or more examples, the features 120 are generated (e.g., defined or designated) based on pre-existing log messages of historical activity logs related to known activities and events of the onboard system 106 (e.g., features 120 are pre-defined). In one or more examples, the features 120 are generated from the log messages 114 of the activity log 112 collected from the onboard system 106 (e.g., features 120 are defined in real-time).

Selection or designation of the features 120 are performed by any suitable technique. As an example, selection of particular fields 134 and designation of the features 120 from those fields 134 are performed manually by a subject matter expert using vehicle and/or system domain knowledge.

In one or more examples, each one of the features 120 includes select information (e.g., a selection of textual data) from a log message generated by the onboard system 106. Once the features 120 are designated, the features 120 are identified within the log messages 114 of the activity log 112 being analyzed to create the feature list 118 and to provide a technique for parsing the log messages 114 into manageable, unique segments of information, which are then used to identify the episode 122 (e.g., a particular activity 116) and to classify the episode 122 (e.g., a particular event 126) from the feature list 118 (e.g., based on the log messages 114 of the activity log 112).

In one or more examples, at least one of the features 120 is associated with (e.g., generated from or identified within) one of the log messages 114. As an example, a first feature 120-1 consists of relevant information from a first log massage 114-1. As such, the first feature 120-1 is associated with or can be used to describe the activity 116 performed by the onboard system 106.

In one or more examples, more than one of the features 120 is associated with (e.g., generated from or identified within) one of the log messages 114. As an example, the first feature 120-1 consists of a first sub-set of relevant information (e.g., a first sub-string of text) from the first log massage 114-1, a second feature 120-2 consists of a second sub-set of relevant information (e.g., a second sub-string of text) from the first log massage 114-1, and a third feature 120-3 consists of a third sub-set of relevant information (e.g., a third sub-string of text) from the first log massage 114-1. As such, the first feature 120-1 is associated with or is used to describe the activity 116 performed by the onboard system 106 in a first manner or at a first (e.g., general or broad) level of specificity. The combination of the first feature 120-1 and the second feature 120-2 is associated with or is used to describe the activity 116 performed by the onboard system 106 in a second (e.g., different) manner or at a second (e.g., more detailed) level of specificity. The combination of the first feature 120-1, the second feature 120-2, and the third feature 120-3 is associated with or is used to describe the activity 116 performed by the onboard system 106 in a third (e.g., different) manner or at a third (e.g., even more detailed) level of specificity.

The selection or designation of one or more of the features 120 used to characterize the activity 116 is referred to herein as a feature set 130. The feature set 130 is used to define the episode 122. In one or more examples, the feature set 130 is found in a single log message 114. In one or more examples, the feature set 130 is found in a plurality of the log messages 114.

In one or more examples, the method 1000 includes a step of (block 1012) defining the episode 122 as the feature set 130 (e.g., a predetermined set of a number of the features 120). The feature set 130 is created based on the predetermined or predefined selection of one or more of the features 120 that, individually or in combination, describe one of the activities 116 performed by one of the onboard systems 106.

As an example, a first feature set 130-1 includes the first feature 120-1, the second feature 120-2, and the third feature 120-3 (e.g., as shown in FIG. 2). As such, the specific selection and combination of feature 120-1, feature 120-2, and feature 120-3 (e.g., feature set 130-1) is indicative of or describes the activity 116 of the onboard system 106. In one or more examples, the feature set 130 includes any combination of and/or any number of the features 120.

In one or more examples, the feature set 130 is generated and the episode 122 is defined based on pre-existing log messages of historical activity logs related to known activities and events of the onboard system 106 (e.g., feature set 130 is pre-defined). In one or more examples, the feature set 130 is generated and the episode 122 is defined from the log messages 114 of the activity log 112 collected from the onboard system 106 (e.g., feature set 130 is defined in real-time).

Selection or designation of the features 120 that define the feature set 130 is performed by any suitable technique. As an example, selection of particular features 120 and inclusion of those features 120 to define the feature set 130 representing the episode 122 is performed manually by a subject matter expert using vehicle and/or system domain knowledge.

Referring now to FIG. 3, which illustrates an example of the log message 114. In one or more examples, the log message 114 shown in FIG. 3 is an example of a log message from which the features 120 are originally defined. In one or more examples, the log message 114 shown in FIG. 3 is an example of a log message from which the feature list 118 is created.

Generally, each one of the log messages 114 of the activity log 112 includes a string of text (e.g., textual log data). The log message 114 includes a plurality of fields 134 (e.g., a text field). Each field 134 consists of a sub-string of the text related to a piece of contextual information.

As examples, the field 134 includes a designation of the date and time that the log message 114 was created (e.g., a timestamp), a designation of the onboard system 106 or component thereof that generated the log message 114, a designation of the process (e.g., file path or filename) executed by the onboard system 106, designations for the communications gateway (e.g., source internet protocol (IP) address, destination IP address, media access control (MAC) address, communications port, communications protocol, etc.) and the like. In one or more examples, one or more of the fields 134 includes a parameter (e.g., system identification, source IP address, destination port, etc.) and a numerical value or textual descriptor that is associated with the parameter (e.g., the system name, the IP address number, the destination port number, etc.). Additionally, in one or more examples, one or more of the fields 134 includes freeform text, additional informational messages, and the like (e.g., vehicle identification number, software part number, etc.) that is associated with the activity 116, the onboard system 106, and/or the vehicle 108).

It should be understood that, in most cases, the fields 134 of the log messages 114 are not standardized and there can be wide variations in the format and content of the log messages 114 in the activity log 112. For example, the fields 134 may or may not be separated by spaces, the parameter may or may not be separated from the associated value or descriptor by punctuation (e.g., colon), the terminology (e.g., text) used to describe the parameter in one log message may or may not be different from that of a different log message, and the like.

Referring now to FIG. 4, which illustrates an example of features 120 designated from the log message 114 shown in FIG. 3 and examples of a plurality of episodes 122 defined by a selected set of one or more of the features 120. In one or more examples, the log message 114 shown in FIG. 4 is an example of a log message from which the features 120 are originally defined. In one or more examples, the log message 114 shown in FIG. 4 is an example of a log message from which the feature list 118 is created.

Generally, one or more of the fields 134 of the log message 114 are designated as features 120, which are used to define the episode 122 and classify the episode 122. Additionally, in one or more examples, one or more of the fields 134 are designated as metadata 194, which are not used to define or classify the episode 122 but which are included in the episode definition to supply additional contextual information, for example, which are used during a follow-on investigation of a cybersecurity threat or attack.

In the illustrative example, each one of field 134-3, field 134-4, field 134-5, field 134-6, field 134-8, and field 134-10 is selected and designated as one of the features 120. Each one of field 134-1 and field 134-12 is selected and designated metadata 194.

In a first example, first episode 122-1 is defined by first feature set 130-1, consisting of first feature 120-1 and first metadata 194-1. In this example, first feature 120-1 includes feature identification F1 and field 134-3 (e.g., a system identification that identifies the onboard system 106 that generated the log message 114). First metadata 194-1 includes first metadata identification G1 and field 134-1 (e.g., a timestamp associated with the log message 114). As such, as an example, first episode 122-1 is very broad and characterizes any instance of the activity 116 performed by the onboard system 106.

In a second example, second episode 122-2 is defined by second feature set 130-2, consisting of first feature 120-1, second feature 120-2, and first metadata 194-1. In this example, first feature 120-1 includes feature identification F1 and field 134-3 (e.g., a system identification that identifies the onboard system 106 that generated the log message 114). Second feature 120-2 includes feature identification F2 and field 134-5 (e.g., destination IP address). First metadata 194-1 includes metadata identification G1 and field 134-1 (e.g., a timestamp associated with the log message 114). As such, as an example, second episode 122-2 increases the specificity of the activity 116 performed and, for example, characterizes any instance of the activity 116 performed by the onboard system 106 in communication with a particular IP address.

In other examples, designating additional and/or different fields 134 as features 120 and including those additional and/or different features 120 in the feature set 130 enables different episodes 122 to be defined, which characterize the same activity 116 at different levels of specificity or which characterize different activities 116. As an example, third episode 122-3 is defined by third feature set 130-3, which further increases the specificity of the activity 116 performed. As another example, fourth episode 122-4 is defined by fourth feature set 130-4, which even further increases the specificity of the activity 116 performed.

Figure 5:
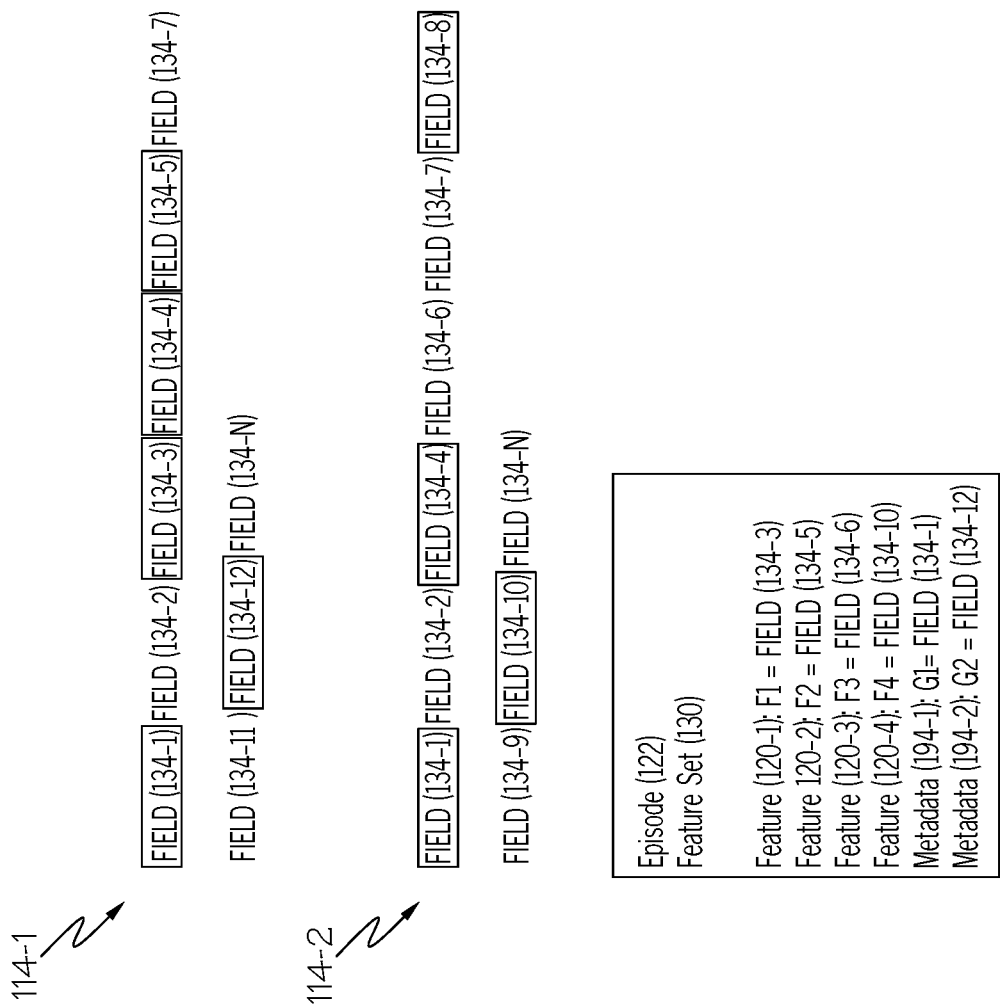
FIG. 5 illustrates an example of features designated from a plurality of log messages.

Referring now to FIG. 5, which illustrates an example of features 120 designated from more than one log message 114 to create the feature set 130. In one or more examples, the feature set 130 that defines the episode 122, which characterizes the activity 116, includes features 120 designated from more than one type of log message 114 (e.g., log message 114-1 and log message 114-2). In these examples, the activity 116 is characterized by information contained in a plurality of log messages 114.

Additionally, in one or more examples, one of more of the features 120 includes more than one field 134. As an example, rather than first feature 120-1 including field 134-3, first feature 120-1 includes field 134-2 and field 134-3 or another combination of two or more fields 134.

In one or more examples, the step of (block 1010) generating the features 120 includes a step of generating a master list 192 of the features 120 (e.g., as shown in FIG. 11). The master list 192 includes all of the features 120 defined or designated from log messages.

In one or more examples, the master list 192 is created by clustering the features 120, for example, using a text clustering algorithm. As an example, features 120 that include contextually related fields 134 are grouped together before extraction of the episode 122 from the feature list 118.

In one or more examples, the master list 192 is created by aggregating the features 120, for example, following the clustering operation. As an example, different text can be used in the log messages 114 for the same general contextually related field 134. As such, the different text of the fields 134 represented by different features 120 can be substituted with the same text (e.g., a keyword).

In one or more examples, the master list 192 of the features 120 is updated, for example, during profiling and analysis of the log messages 114 of the activity log 112. As an example, the content (e.g., fields 134) of the log message 114 of the activity log 112 being analyzed is compared to the features 120 of the master list 192 in order to map the fields 134 of the log message 114 to corresponding ones of the features 120 and to further analyze the log message 114 based on the log profile (e.g., feature set 130 representing the episode 122) established from historical data. Any log data (e.g., field 134) that cannot be mapped to the features 120 of the master list 192 is processed and used to define a new feature 120 (e.g., as described above with respect to feature generation).

Referring again to FIGS. 1 and 2, as such, the features 120 are extracted (e.g., identified and pulled out) from each log message 114 of the activity log 112 to form the feature list 118.

In one or more examples, the step of (block 1010) generating the features 120 from the log messages 114 of the activity log 112 and the step of (block 1008) extracting the feature list 118 from the activity log 112 are integrated into a unitary processing operation in which the feature list 118 is created as the features 120 are pulled from the log messages 114. In other examples, the step of (block 1010) generating the features 120 from the log messages 114 of the activity log 112 and the step of (block 1008) extracting the feature list 118 from the activity log 112 are discrete processing operations in which the features 120 are defined or created from the log massages 114 and the feature list 118 is then generated from the list of created features 120.

In one or more examples, the method 1000 includes a step of (block 1014) extracting an episode 122 from the feature list 118. As described above, a number of feature sets 130 (e.g., feature set 130-1, feature set 130-2, feature set 130-3, feature set 130-N shown in FIG. 2) are extracted from the feature list 118 and the episode 122 is defined based on the feature set 130 (e.g., a select combination of the features 120). Accordingly, the episode 122 is indicative or is representative of the activity 116 of the onboard system 106 as defined by the feature set 130. In one or more examples, the step of (block 1014) extracting the episode 122 from the feature list 118 includes a step of searching for the feature set 130 (i.e., the episode 122) from within the feature list 118.

Figure 6:
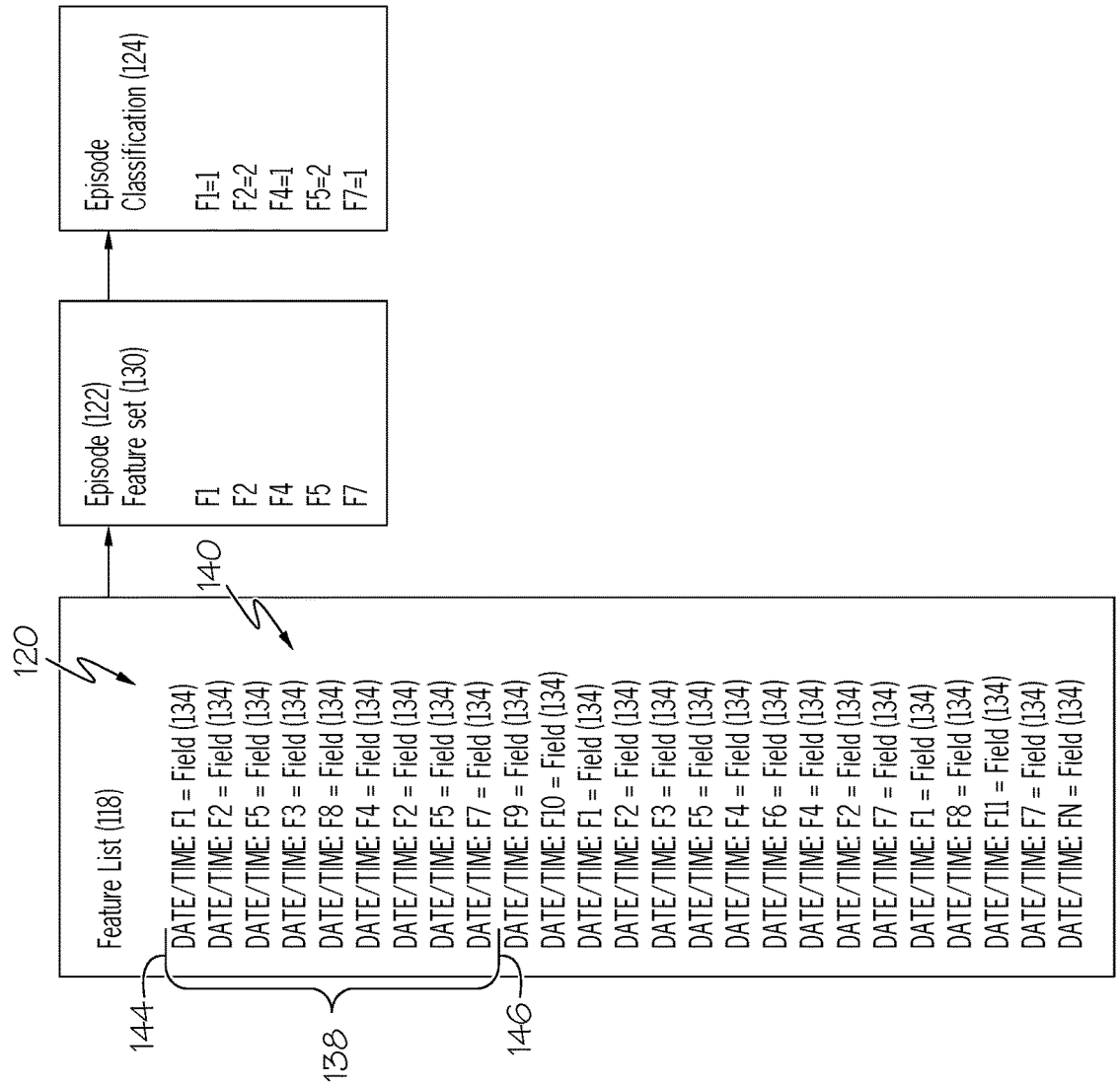
FIG. 6 illustrates an example of extraction of an episode from a feature list.

Referring now to FIG. 6, which illustrates an example of an episode extraction operation (e.g., block 1014). In one or more examples, according to the method 1000 (e.g., shown in FIG. 1), the step of (block 1014) extracting the episode 122 from the feature list 118 includes a step of generating a window 138 within the feature list 118 that includes a batch 140 of the features 120. The step of (block 1014) extracting the episode 122 from the feature list 118 also includes a step of searching for the feature set 130 from the batch 140 of the features 120 in the window 138.

Generally, the window 138 includes a beginning 144 and an end 146 and can have any suitable size defined between the beginning 144 and the end 146. In one or more examples, the window 138 is time-based. As an example, the window 138 is defined by a predetermined time duration (e.g., ten minutes) in which the beginning 144 is a start time and the end 146 is an end time. In one or more examples, the window 138 is feature-based. As an example, the window 138 is defined by a predetermined number of features 120 in which the beginning 144 is one of the features 120 (e.g., feature F1 shown in FIG. 6) known to be contained in the log message 114 generated at a start of the activity 116 and the end 146 is another one of the features 120 (e.g., feature F7 shown in FIG. 6) known to be contained in a log message 114 generated at an end of the activity 116. In one or more examples, the window 138 is a combination of time-based and feature-based. As an example, the window 138 is defined by a predetermined time duration in which the beginning 144 is one of the features 120 (e.g., feature F1) known to be contained in a log message 114 generated at a start of the activity 116 and the end 146 is a predetermined time duration (e.g., ten minutes) after the occurrence of the feature 120.

Figure 7:
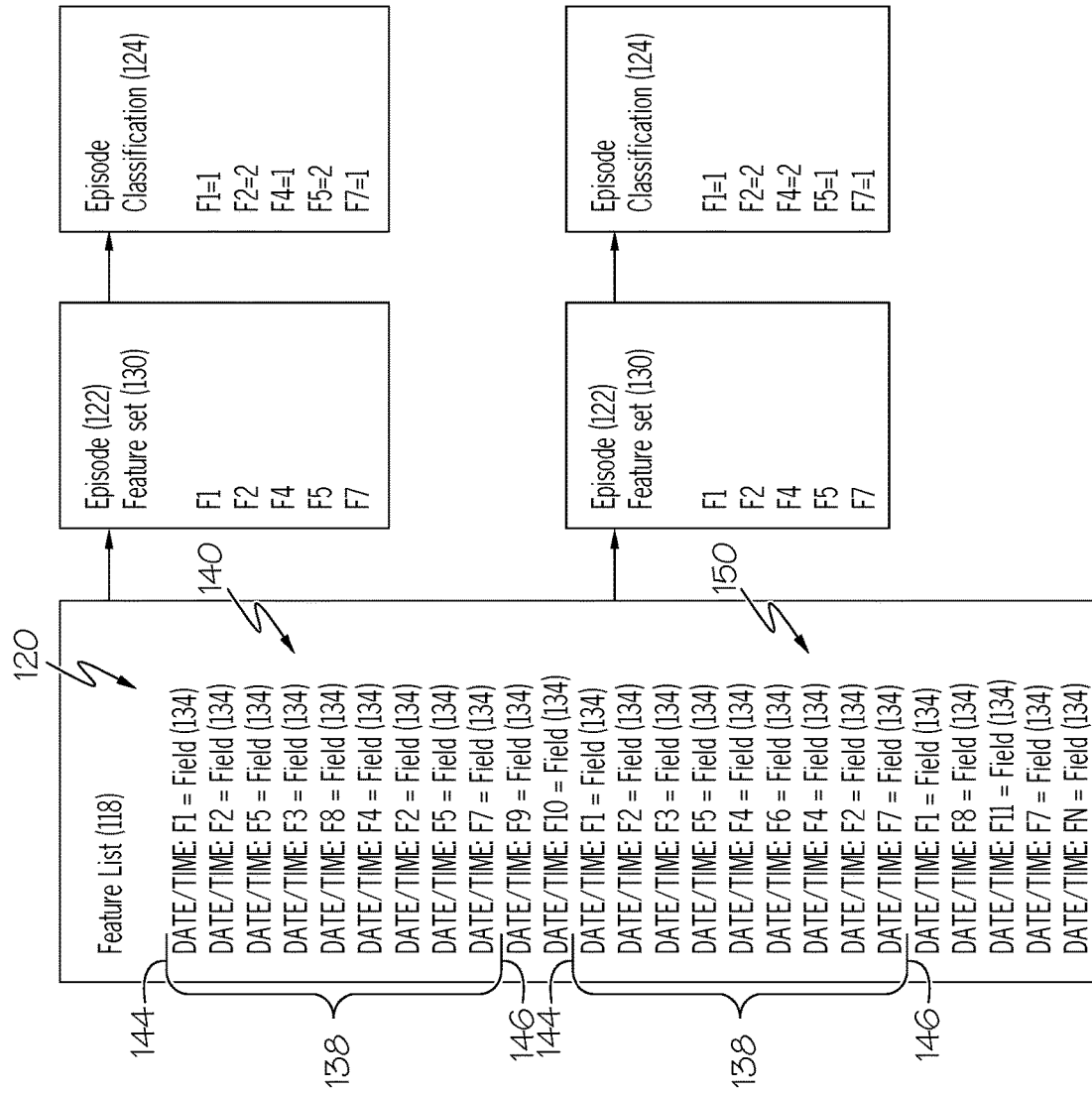
FIG. 7 illustrates another example of extraction of an episode from the feature list.

Referring now to FIG. 7, in one or more examples, the step of searching for the episode 122 is performed incrementally through the feature list 118. As an example, the features 120 defining the feature set 130 is searched within the window 138. If the feature set 130 and, thus, the episode 122 is not found within the window 138, the window 138 is shifted to include a new batch of features 120 and the feature set 130 is searched within the newly defined window 138. If the feature set 130 and, thus, the episode 122 is found within the window 138, the window 138 is shifted to include a new batch of features 120 and another feature set 130 (e.g., defining another instance of the same episode 122 or a different episode 122) is searched within the newly defined window 138.

Referring again to FIGS. 1 and 2, the method 1000 also includes a step of (block 1016) classifying the episode 122 with the episode classification 124. The episode classification 124 is indicative of the event 126 (e.g., one of the events 126) that occurred during the activity 116. In one or more examples, the episode 122 is classified as any one of a plurality of episode classifications 124 (e.g., episode classification 124-1, episode classification 124-2, episode classification 124-3, episode classification 124-N as shown in FIG. 2) based on a tally or count of the number of times each feature 120 of the feature set 130 occurs within the feature list 118 when the feature set 130 is searched and the episode 122 is extracted from the feature list 118.

As illustrated in FIG. 6, in one or more examples, the episode 122, defined by the feature set 130, is identified and found within the search window 138. In the illustrative example, the episode 122 is defined by (e.g., the feature set 130 includes) features F1, F2, F4, F5, and F7. The episode 122 is classified by a tally or count of the number of times each one of the features 120 occurs. In the illustrative example, feature F1 occurs in the features set 130 one time (F1=1), feature F2 occurs in the feature set 130 two times (F2=2), feature F4 occurs in the feature set 130 one time (F4=1), feature F5 occurs in the feature set 130 two times (F5=2), and feature F7 occurs in the feature set 130 one time (F7=1). This combination of designated ones of the features 120, each occurring a predetermined number of times is indicative of a first event 126 of the activity 116 and, thus, the episode 122 is classified as a first episode classification 124.

As illustrated in FIG. 7, in one or more examples, another instance of the episode 122, defined by the feature set 130, is identified and found within the search window 138, as the window 138 progresses through the feature list 118. As described above, in the illustrative example, the episode 122 is defined by (e.g., the feature set 130 includes) features F1, F2, F4, F5, and F7. The episode 122 is classified by the tally or count of the number of times each one of the features 120 occurs. In the illustrative example, feature F1 occurs in the features set 130 one time (F1=1), feature F2 occurs in the feature set 130 two times (F2=2), feature F4 occurs in the feature set 130 two times (F4=2), feature F5 occurs in the feature set 130 one time (F5=1), and feature F7 occurs in the feature set 130 one time (F7=1). This combination of designated ones of the features 120, each occurring a predetermined number of times is indicative of a second event 126 of the activity 116, which is different than the first event 126 and, thus the episode 122 is classified as a second episode classification 124.

Figure 8:
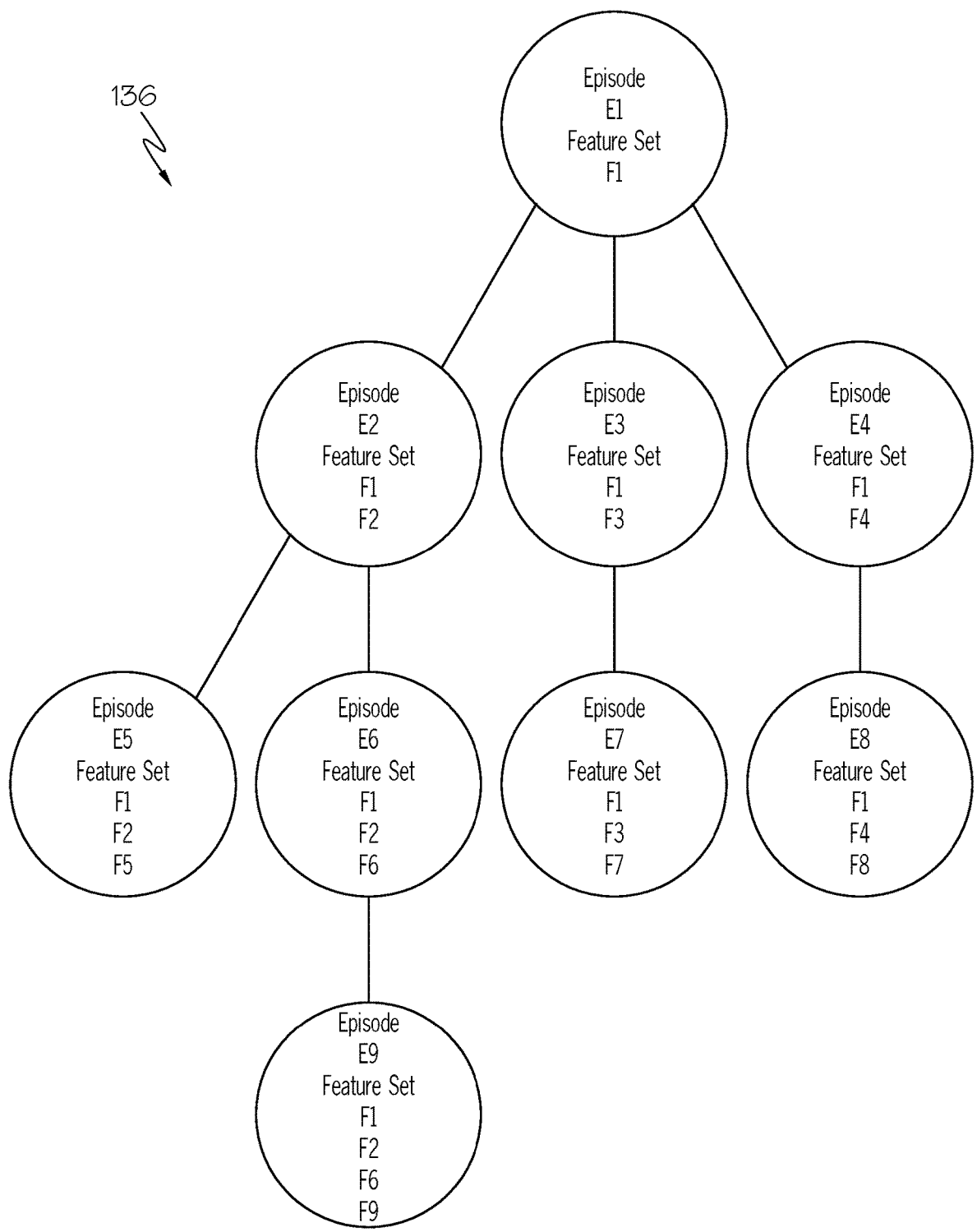
FIG. 8 illustrates an example of a hierarchical tree of features.

Referring again to FIG. 1, in one or more example, the method 1000 includes a step of (block 1018) generating a hierarchical tree 136 (e.g., as shown in FIG. 8) of the features 120 associated with and defining a particular activity 116 at different levels of specificity. As described above, the activity 116 is characterized by any number of episodes 122, defined by a particular feature set 130. The hierarchical tree 136 includes a plurality of leaf nodes, in which each leaf node represents a particular episode 122 characterizing the activity 116. Defining the activity 116 in the layered structure of the hierarchical tree 136 advantageously facilitates aggregated activity type construction and provides higher flexibility in constructing aggregated activity types. As an example, the hierarchical tree 136 is utilized to search for, profile, and analyze a particular activity 116 at different levels of specific operations of the onboard system 106.

As illustrated in FIG. 8, in one or more examples, a log profile can be built based upon a particular leaf node activity type, associated with a particular episode 122 (e.g., episode E5). Alternatively, in one or more examples, a log profile can be built based on an aggregate of multiple layers of activity types, associated with more than one episode 122 (e.g., episode E1, episode E2, and episode E5). Accordingly, analysis of the activity log 112 can be performed at higher levels, which reduces computational requirements. For example, the activity log 112 is analyzed based on the second tier of the hierarchical tree 136 (e.g., leaf node representing episode E2), which requires a lesser number of comparisons to be conducted and improves analysis performance. If, for example, a problem is identified at the leaf node (e.g., episode E2), the activity log 112 is analyzed based on the third tier of the hierarchical tree 136 (e.g., leaf node representing episode E5).

In one or more examples, the hierarchical tree 136 is generated from the master list 192 of the features 120 (e.g., as shown in FIG. 11). As such, the tree hierarchy of the features 120 is arranged based on the key concepts/key words relevant to the activity 116 of the onboard system 106.

Figure 9:
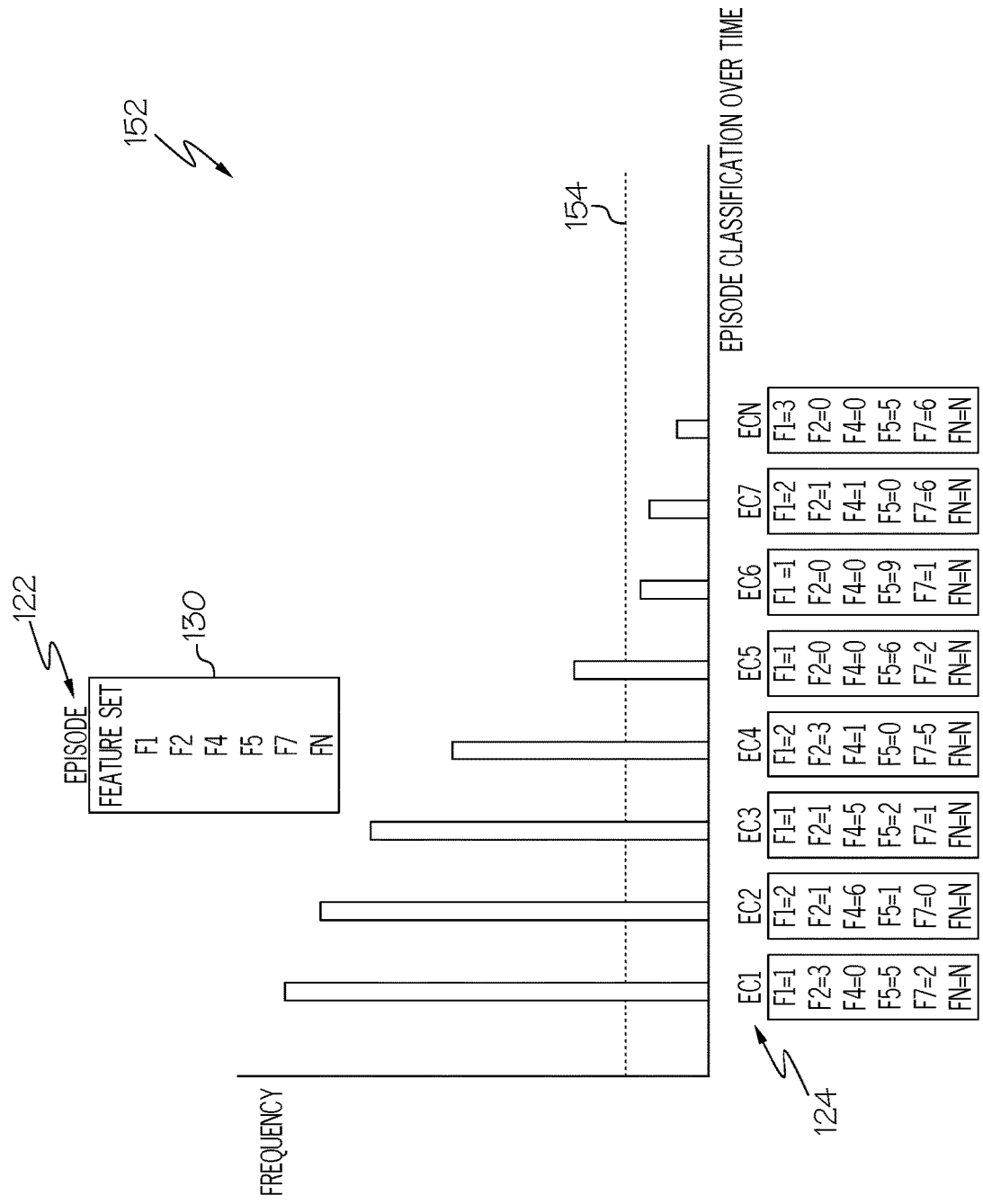
FIG. 9 illustrates an example of a graphical representation of occurrences of a plurality of episode classifications.

Referring now to FIGS. 1 and 9, in one or more examples, the method 1000 (e.g., as shown in FIG. 1) includes a step of (block 1020) graphically representing an occurrence of the episode classification 124 over a predetermined time period. As an example, a graphical display 152 (e.g., as shown in FIG. 9) that is representative of an occurrence of each one of the episode classifications 124 over a predetermined time period is generated. The graphical display 152 facilitates identification of one or more of the episode classifications 124 that are indicative of an outlying event.

Graphically representing occurrences of the episode classifications 124 over a predetermined time period provides a simple visualization that facilitates context to specific activities 116 of the onboard system 106. As illustrated in FIG. 9, the graphical display 152 visually identifies which of the episode classifications 124 (e.g., certain events 126 of a given activity 116) have a high occurrence frequency or rate and which of the episode classifications 124 have a low occurrence frequency or rate. Some episode classifications 124 occur very rarely. Episode classifications 124 having a rare occurrence rate can be automatically identified and can indicate an abnormal activity 116 or event 126 associated with a cybersecurity threat or vulnerability. For example, from a cybersecurity perspective, rare activities are of primary interest because the assumption is that high occurrence or common activities are normal and rare occurrences can be abnormal. Additionally, the event 126 can also be linked to time of occurrence (e.g., 3:00 AM when the vehicle 108 is not in service or when no activity should be occurring). As described in more detail below and illustrated in FIG. 10, this visualization and analysis can be scaled and performed for each one of a plurality of vehicles 108.

In one or more examples, the method 1000 includes a step of (block 1022) comparing the occurrence of the episode classification 124 to a predetermined occurrence threshold 154. In one or more examples, the occurrence threshold 154 is representative of a normal or expected number of occurrences of the event 126 characterized by the episode classification 124.

As an example, the method 1000 includes a step of identifying that the occurrence of the episode classification 124 is less than the predetermined occurrence threshold 154 over a predetermined time period. For example, during analysis of the activity log 112, if an episode classification 124 and, thus, an associated event 126 occurs frequently (e.g., over the occurrence threshold 154), it can be assumed that the event 126 is normal and expected. Alternatively, during analysis of the activity log 112, if an episode classification 124 and, thus, an associated event 126 occurs rarely (e.g., under the occurrence threshold 154), it can be assumed that the event 126 is abnormal and can be indicative of a cybersecurity incident that required a follow-on action.

As another example, the method 1000 includes a step of identifying that the occurrence of the episode classification 124 is greater than the predetermined occurrence threshold 154 over a predetermined time period. For example, during analysis of the activity log 112, if an episode classification 124 and, thus, an associated event 126 occurs infrequently (e.g., under the occurrence threshold 154), it can be assumed that the event 126 is rare. Alternatively, during analysis of the activity log 112, if an episode classification 124 and, thus, an associated event 126 occurs frequently (e.g., over the occurrence threshold 154), it can be assumed that the event 126 is abnormal and can be indicative of a cybersecurity incident that required a follow-on action.

In one or more examples, the method 1000 includes a step of (block 1024) generating a recommended action 156 (e.g., as shown in FIG. 11) based on the comparison of the occurrence of the episode classification 124 to the predetermined occurrence threshold 154. As an example, the method 1000 includes a step of generating at least one recommended action 156 when the occurrence of the episode classification 124 is less than the predetermined occurrence threshold 154 over the predetermined time period. As another example, the method 1000 includes a step of generating at least one recommended action 156 when the occurrence of the episode classification 124 is greater than the predetermined occurrence threshold 154 over the predetermined time period. Examples of the recommended action 156 include a root cause investigation, a lower-level leaf node analysis (e.g., based on the hierarchical tree 136 shown in FIG. 8), and any other suitable guidance to mitigate a potential cybersecurity threat.

Accordingly, the method 1000 provides a normal profile of the activity 116 and the event 126 associated with the onboard system 106 and/or the vehicle 108, which can be based on the hierarchical event types, to be built based on historical operation data (e.g., using machine learning and/or statistical analysis). Detection of a cybersecurity incident or other anomaly is based on an event frequency-based threshold per flight. Additional, rule-based detection can further incorporate additional contextual information from any of the log messages 114. Additionally, log event types (e.g., episode classifications 124) can be assigned a numeric severity level to indicate priority for the purpose of further analysis.

In one or more examples, implementation of the method 1000 is scaled and applied to any number of onboard systems 106 of the vehicle 108. In these examples, the method 1000 includes the step of (block 1002) connecting with a number of the onboard systems 106 of the vehicle 108. Each one of the onboard systems 106 is connectable (e.g., is connected or has been connected) to the network 110. The method 1000 also includes the step of (block 1004) collecting a number of activity logs 112 generated by the onboard systems 106. The activity logs 112 include the log messages 114 that are indicative of a number of activities 116 of the onboard systems 106. As an example, each one of the activity logs 112 includes a number of log messages 114. Each one of the log messages 114 is indicative of one of the activities 116 of one of the onboard systems 106. The method 1000 further includes a step of (block 1008) extracting the feature list 118 from the activity logs 112. The method 1000 additionally includes a step of (block 1014) extracting a number of episodes 122 from the feature list 118. The episodes 122 are indicative of the activities 116 of the onboard systems 106. As an example, each one of the episodes 122 is indicative of one of the activities 116 of one of the onboard systems 106. The method 1000 also includes a step of (block 1016) classifying the episodes 122 with episode classifications 124. The episode classifications 124 are indicative of events 126 that occurred during the activities 116. As an example, each one of the episode classifications 124 is indicative of one of the events 126 of a corresponding one of the activities 116 of one of the onboard systems 106.

In one or more examples, the method 1000 includes the step of (block 1020) the graphically representing an occurrence of each one of the episode classifications 124 associated with one of the episodes 122 for each one of the onboard systems 106 over a predetermined time period. As an example, the graphical display 152 (e.g., as shown in FIG. 9) is generated for each one of the episodes 122 for each one of the onboard systems 106 of the vehicle 108.

In one or more examples, the method 1000 includes the step of (block 1022) comparing an occurrence of any one of the episode classifications 124 associated with one of the episodes 122 for any one of the onboard systems 106 with the predetermined occurrence threshold 154 over a predetermined time period.

In one or more examples, implementation of the method 1000 is scaled and applied to any number of onboard systems 106 of any number of vehicles 108 (e.g., forming a fleet 172 as shown in FIG. 11). In these examples, the method 1000 includes the step of (block 1002) connecting with a number of the onboard systems 106 of a number of the vehicles 108. Each one of the onboard systems 106 of each one of the vehicles 108 is connectable (e.g., is connected or has been connected) to the network 110. The method 1000 also includes a step of (block 1004) collecting a number of activity logs 112 generated by the onboard systems 106. The activity logs 112 includes the log messages 114 that are indicative of a number of activities 116 of the onboard systems 106. As an example, each one of the activity logs 112 includes a number of the log messages 114. Each one of the log messages 114 is indicative of one of the activities 116 of one of the onboard systems 106 of one of the vehicles 108. The method 1000 further includes the step of (block 1008) extracting the feature list 118 from the activity logs 112. The method 1000 additionally includes the step of (block 1014) extracting a number of episodes 122 from the feature list 118. The episodes 122 are indicative of the activities 116 of the onboard systems 106. As an example, each one of the episodes 122 is indicative of one of the activities 116 of one of the onboard systems 106 of one of the vehicles 108. The method 1000 also includes the step of (block 1016) classifying the episodes 122 with the episode classifications 124. The episode classifications 124 are indicative of events 126 that occurred during the activities 116. As an example, each one of the episode classifications 124 is indicative of one of the events 126 of a corresponding one of the activities 116 of one of the onboard systems 106 of one of the vehicles 108.

Figure 10:
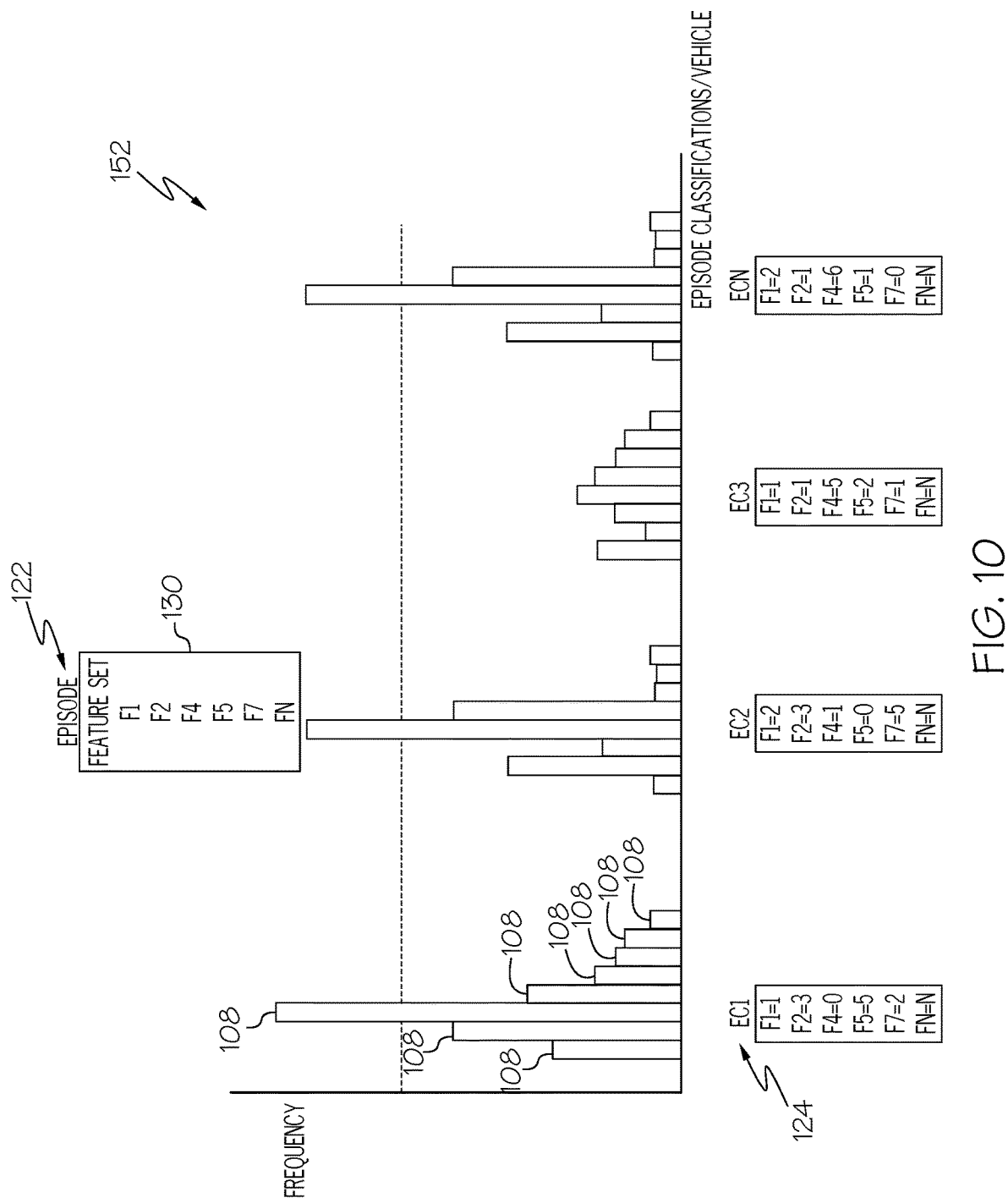
FIG. 10 illustrates an example of the graphical representation of occurrences of a plurality of episode classifications for a plurality of vehicles.

In one or more examples, the method 1000 includes the step of (block 1020) graphically representing an occurrence of each one of the episode classifications 124 associated with one of the episodes 122 for each one of the vehicles 108 over a predetermined time period. As an example, the graphical display 152 (e.g., as shown in FIG. 10) is generated for each one of the episodes 122 of each one of the vehicles 108. The graphical display 152 facilitates identification of one or more of the episode classifications 124 that are indicative of an outlying event based on or compared to other vehicles 108.

As an example, all the vehicles 108 of the fleet 172 can perform a certain task (e.g., event 126) of the activity 116 very frequently or very infrequently. As such, event classifications 124 that occur at substantially the same frequency among the vehicles 108 can be assumed to be normal. However, a certain event 126 (e.g., episode classification 124) can have a substantially higher or lower rate of occurrence in one vehicle 108 as compared to the other vehicles 108. Such outlying events 126 can be unusual and require further investigation.

In one or more examples, the method 1000 includes the step of (block 1022) comparing the occurrence of the episode classification 124 to the predetermined occurrence threshold 154. In one or more examples, the occurrence threshold 154 is representative of a normal or expected number of occurrences of the event 126 characterized by the episode classification 124.

As an example, the method 1000 includes a step of identifying that the occurrence of the episode classification 124 associated with a particular vehicle 108 is greater than the predetermined occurrence threshold 154 over a predetermined time period. For example, during analysis of the activity log 112, if an episode classification 124 and, thus, an associated event 126 occurs at approximately the same frequency or rate relative to other vehicles 108 (e.g., under the occurrence threshold 154), it can be assumed that the event 126 is normal and expected. Alternatively, during analysis of the activity log 112, if an episode classification 124 and, thus, an associated event 126 occurs at a higher frequency or rate relative to other vehicles 108 (e.g., over the occurrence threshold 154), it can be assumed that the event 126 is abnormal and can be indicative of a cybersecurity incident that required a follow-on action.

As another example, the method 1000 includes a step of identifying that the occurrence of the episode classification 124 is less than the predetermined occurrence threshold 154 over a predetermined time period. For example, during analysis of the activity log 112, if an episode classification 124 and, thus, an associated event 126 occurs at approximately the same frequency or rate relative to other vehicles 108 (e.g., under the occurrence threshold 154), it can be assumed that the event 126 is normal and expected. Alternatively, during analysis of the activity log 112, if an episode classification 124 and, thus, an associated event 126 occurs a lower frequency or rate relative to other vehicles 108 (e.g., under the occurrence threshold 154), it can be assumed that the event 126 is abnormal and can be indicative of a cybersecurity incident that required a follow-on action.

Referring now to FIG. 11, the system 100 is an example of implementation of the method 1000 (e.g., shown in FIG. 1) within a computer system. In one or more examples, the system 100 includes a processor 102 and a storage device 104. The storage device 104 contains instructions 180. Execution of the instructions causes the processor 102 to connect with the onboard system 106 of the vehicle 108. The onboard system 106 is connectable (e.g., is connected or has been connected) to the network 110. Execution of the instructions also causes the processor 102 to collect the activity log 112 generated by the onboard system 106. The activity log 112 includes the log messages 114 that are indicative of the activity 116 of the onboard system 106. Execution of the instructions further causes the processor 102 to extract the feature list 118 from the activity log 112. The feature list 118 includes the features 120 and each one of the features 120 includes select information from a corresponding one of the log messages 114. Execution of the instructions additionally causes the processor 102 to extract the episode 122 from the feature list 118. The episode 122 is indicative of the activity 116 of the onboard system 106. Execution of the instructions also causes the processor 102 to classify the episode 122 with the episode classification 124. The episode classification 124 is indicative of the event 126 that occurred during the activity 116.

In one or more examples, the episode 122 is extracted from the feature list 118 according to a predetermined episode rule 128 that defines the episode 122 as the feature set 130 of the features 120 from the feature list 118. The episode 122 is classified according to a predetermined classification rule 132 that defines the episode classification 124 as a number of times each one of the features 120 has occurred in the feature set 130.

In one or more examples, execution of the instructions 180 causes the processor 102 to generate the features 120 from the log messages 114. Each one of the features 120 includes at least one field 134 expressed in the corresponding one of the log messages 114.

In one or more examples, execution of the instructions 180 causes the processor 102 to generate the hierarchical tree 136 (e.g., as shown in FIG. 8) of the features 120 associated with the activity 116.

In one or more examples, execution of the instructions 180 causes the processor 102 to generate the window 138 (e.g., as shown in FIG. 6) within the feature list 118 that includes the batch 140 of the features 120 and to search for the feature set 130 from the batch 140 of the features 120 in the window 138.

In one or more examples, the window 138 is a time duration and is bound by the beginning 144 (e.g., start time) and the end 146 (e.g., end time).

In one or more examples, execution of the instructions 180 causes the processor 102 to shift the window 138 within the feature list 118 by a time interval such that the window 138 include a second batch 150 (e.g., as shown in FIG. 7) of the features 120 and to search for the feature set 130 from the second batch 150 of the features 120 in the window 138.

In one or more examples, the window 138 is bound by a first one of the features 120 of the feature set 130 and a second one of the features 120 of the feature set 130. The first one of the features 120 is indicative of a start of the activity 116 (e.g., beginning 144). The second one of the features 120 is indicative of an end of the activity 116 (e.g., end 146).

In one or more examples, execution of the instructions 180 causes the processor 102 to format the activity log 112 for extraction of the feature list 118.

In one or more examples, execution of the instructions 180 causes the processor 102 to generate the graphical display 152 (e.g., as shown in FIG. 9) that is representative of an occurrence of the episode classification 124 over a predetermined time period.

In one or more examples, execution of the instructions 180 causes the processor 102 to compare an occurrence of the episode classification 124 to the predetermined occurrence threshold 154 over a predetermined time period and to identify that (or when) an occurrence of the episode classification 124 is less than (or greater than) the predetermined occurrence threshold 154 over the predetermined time period.

In one or more examples, execution of the instructions 180 causes the processor 102 to generate the recommended action 156 based on the comparison of the occurrence of the episode classification 124 to the predetermined occurrence threshold 154, for example, when the occurrence of the episode classification 124 is less than the predetermined occurrence threshold 154 over the predetermined time period.

In one or more examples, the system 100 is scalable and is applied to any number of the onboard systems 106 of the vehicle 108. In such examples of the system 100, execution of the instructions 180 causes the processor 102 to connect with a number of the onboard systems 106 of the vehicle 108. Each one of the onboard systems 106 is connectable (e.g., is connected or has been connected) to the network 110. Execution of the instructions 180 also causes the processor 102 to collect a number of the activity logs 112 generated by the onboard systems 106. The activity logs 112 include the log messages 114 that are indicative of a number of the activities 116 of the onboard systems 106. Execution of the instructions 180 further causes the processor 102 to extract the feature list 118 from the activity logs 112. Execution of the instructions 180 additionally causes the processor 102 to extract a number of the episodes 122 from the feature list 118. The episodes 122 are indicative of the activities 116 of the onboard systems 106. Execution of the instructions 180 also causes the processor 102 to classify the episodes 122 with the episode classifications 124. The episode classifications 124 are indicative of events 126 that occurred during the activities 116.

In one or more examples of the system 100, execution of the instructions 180 causes the processor 102 to generate the graphical display 152 (e.g., as shown in FIG. 9) that is representative of an occurrence of each one of the episode classifications 124 over a predetermined time period.

In one or more examples of the system 100, execution of the instructions 180 causes the processor 102 to compare an occurrence of any one of the episode classifications 124 to the predetermined occurrence threshold 154 and to identify that (e.g., when) an occurrence of any one of the episode classifications 124 is less than or greater than a predetermined occurrence threshold 154 over a predetermined time period.

In one or more examples, the system 100 is scalable and is configured to be applied to any number of the onboard systems 106 of any number of the vehicles 108 (e.g., forming the fleet 172). In such examples of the system 100, execution of the instructions 180 causes the processor 102 to connect with a number of onboard systems 106 of a number of vehicles 108. Each one of the onboard systems 106 is connectable (e.g., is connected or has been connected) to the network 110. Execution of the instructions 180 also causes the processor 102 to collect a number of the activity logs 112 generated by the onboard systems 106. The activity logs 112 include the log messages 114 that are indicative of a number of the activities 116 of the onboard systems 106. Execution of the instructions 180 further causes the processor 102 to extract the feature list 118 from the activity logs 112. Execution of the instructions 180 additionally causes the processor 102 to extract a number of the episodes 122 from the feature list 118. The episodes 122 are indicative of the activities 116 of the onboard systems 106. Execution of the instructions 180 also causes the processor 102 to classify the episodes 122 with the episode classifications 124. The episode classifications 124 are indicative of the events 126 that occurred during the activities 116.

In one or more examples of the system 100, execution of the instructions 180 causes the processor 102 to generate the graphical display 152 (e.g., as shown in FIG. 10) that is representative of an occurrence of each one of the episode classifications 124 associated with one of the episodes 122 for each one of the vehicles 108 over a predetermined time period.

In one or more examples of the system 100, execution of the instructions 180 causes the processor 102 to compare an occurrence of any one of the episode classifications 124 associated with one of the episodes 122 for any one of the vehicles 108 to the predetermined occurrence threshold 154 and/or relative to the other vehicles 108 and to identify that (e.g., when) an occurrence of any one of the episode classifications 124 associated with one of the episodes 122 for any one of the vehicles 108 is greater than or less than the predetermined occurrence threshold 154 over a predetermined time period.

Figure 12:
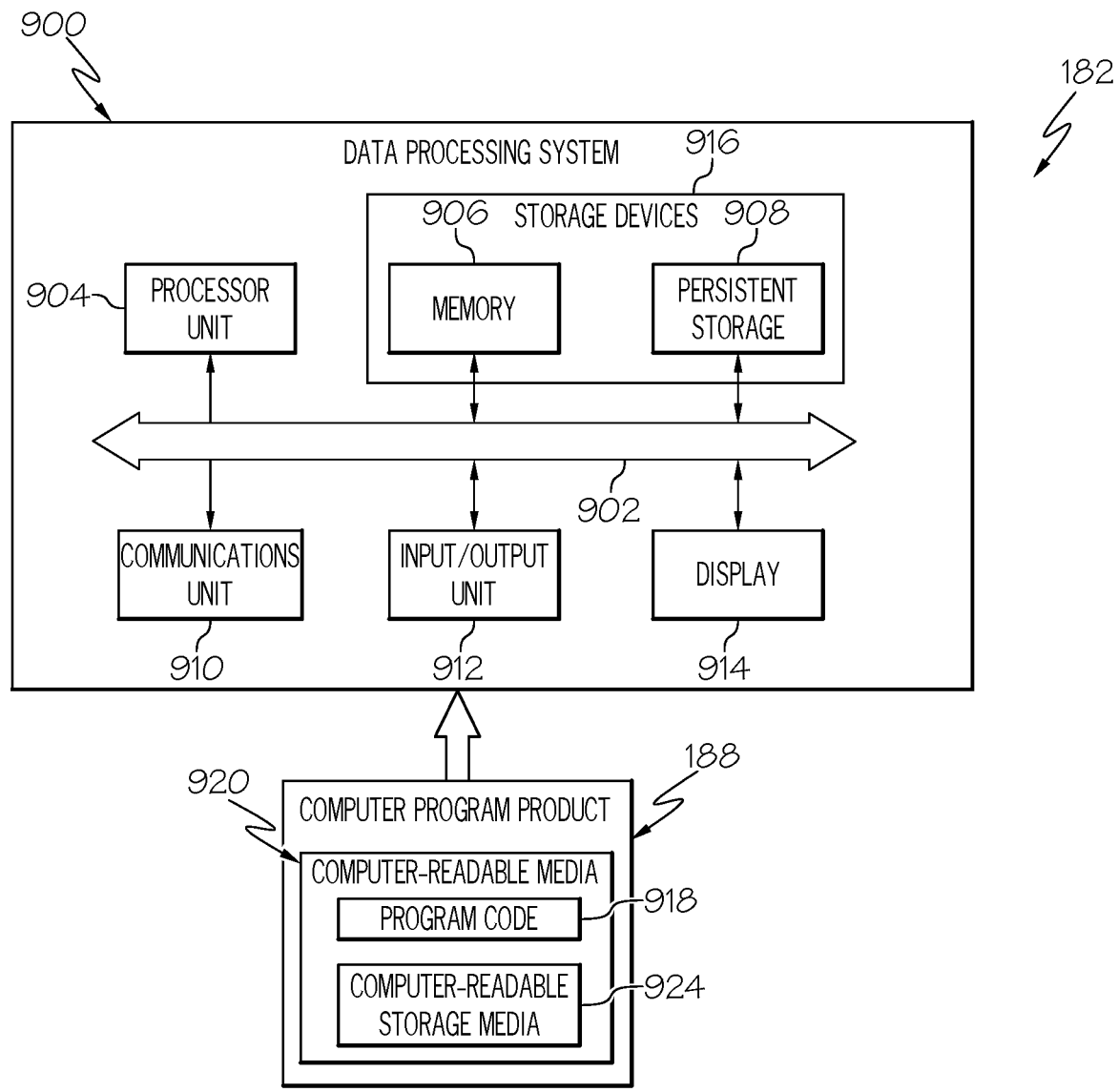
FIG. 12 is a schematic block diagram of a computing device shown in FIG. 11.

Referring generally to FIGS. 1 and 2 and particularly to FIG. 12, in one of more examples, the program 188 takes the form of a computer program product. The program 188 includes a non-transitory computer readable medium 920 containing the instructions 180 that causes the processor 102 to execute a process. In one or more examples, the process is a computer implementation of the method 1000 (e.g., shown in FIG. 1).

In one or more examples, execution of the instructions 180 causes the processor 102 to execute the process, which includes a step of connecting to the onboard system 106 of a vehicle 108. The onboard system 106 is connectable (e.g., is connected or has been connected) to the network 110. The process also includes a step of collecting the activity log 112 from the onboard system 106. The activity log 112 includes log messages 114 indicative of the activity 116 of the onboard system 106. The process also includes a step of extracting the feature list 118 from the activity log 112. The feature list 118 includes features 120 and each one of the features 120 includes select information from a corresponding one of the log messages 114. The process further includes a step of extracting the episode 122 from the feature list 118. The episode 122 is indicative of the activity 116 of the onboard system 106. The process additionally includes a step of classifying the episode 122 with the episode classification 124. The episode classification 124 is indicative of the event 126 that occurred during the activity 116.

In one or more examples, execution of the instructions 180 causes the processor 102 to execute the process, which includes a step of extracting the episode 122 from the feature list 118 according to the predetermined episode rule 128 (e.g., shown in FIG. 11). The episode rule 128 defines the episode 122 as the feature set 130 of the features 120. Execution of the instructions 180 causes the processor 102 to execute the process, which includes a step of classifying the episode 122 according to the predetermined classification rule 132. The classification rule 132 defines the episode classification 124 as a number of times each one of the features 120 has occurred in the feature set 130.

In one or more examples, execution of the instructions 180 causes the processor 102 to execute the process, which includes a step of generating the features 120 from the log messages 114. Each one of the features 120 includes at least one field 134 expressed or contained in a corresponding one of the log messages 114.

In one or more examples, execution of the instructions 180 causes the processor 102 to execute the process, which includes a step of generating the hierarchical tree 136 (e.g., as shown in FIG. 8) of the features 120 associated with the activity 116.

In one or more examples, execution of the instructions 180 causes the processor 102 to execute the process, which includes a step of graphically representing an occurrence of the episode classification 124 over a predetermined time period (e.g., as shown in FIGS. 9 and 10).

In one or more examples, execution of the instructions 180 causes the processor 102 to execute the process, which includes a step of comparing an occurrence of the episode classification 124 to the predetermined occurrence threshold 154 and a step of identifying that an occurrence of the episode classification 124 is less than or greater than the predetermined occurrence threshold 154.

In one or more examples, execution of the instructions 180 causes the processor 102 to execute the process, which includes a step of generating the recommended action 156 when the occurrence of the episode classification 124 is less than or greater than the predetermined occurrence threshold 154 over the predetermined time period.

Furthermore, in one or more examples, execution of the instructions 180 can be scaled and applied to any number of the onboard systems 106 of any number of the vehicles 108, as described above with respect to the method 1000 and the system 100.

In one or more examples, the program 188 includes multiple modules or agents used to profile and classify the activities 116 and events 126 of the onboard systems 106. The modules of the program 188 generally perform different functions, such as, identifying specific log messages 114 related to specific activities 116, determining the start and end of the activity 116, designation of the features 120 from the log messages 114, designation of the episodes 122 from as the feature set 130 from the feature list 118, and classification of each episode 122.

Referring to FIG. 12, in one or more examples, the computing device 182 (e.g., shown in FIG. 1) includes a data processing system 900. In one or more examples, the data processing system 900 includes a communications framework 902, which provides communications between at least one processor unit 904, one or more storage devices 916, such as memory 906 and/or persistent storage 908, a communications unit 910, an input/output (I/O) unit 912, and a display 914. In this example, the communications framework 902 takes the form of a bus system.

In one or more examples, the at least one processor unit 904 is an example of the processor 102 of the computing device 182 (e.g., as shown in FIG. 1). In one or more examples, the storage devices 916 are examples of the storage device 104 (e.g., memory) of the computing device 182 (e.g., as shown in FIG. 1).

The processor unit 904 serves to execute instructions for software that can be loaded into the memory 906. In one or more examples, the processor unit 904 is a number of processors, a multi-processor core, or some other type of processor, depending on the particular implementation.

The memory 906 and the persistent storage 908 are examples of the storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. The storage devices 916 may also be referred to as computer readable storage devices in one or more examples. The memory 906 is, for example, a random-access memory or any other suitable volatile or non-volatile storage device. The persistent storage 908 can take various forms, depending on the particular implementation.

For example, the persistent storage 908 contains one or more components or devices. For example, the persistent storage 908 is a hard drive, a solid state hard drive, a flash memory, a rewritable optical disk, a rewritable magnetic tape, or some combination of the above. The media used by the persistent storage 908 also can be removable. For example, a removable hard drive can be used for the persistent storage 908.

The communications unit 910 provides for communications with other data processing systems or devices. In one or more examples, the communications unit 910 is a network interface card.

Input/output unit 912 allows for input and output of data with other devices that can be connected to the data processing system 900. For example, the input/output unit 912 provides a connection for user input through at least one of a keyboard, a mouse, or some other suitable input device. Further, the input/output unit 912 can send output to a printer. The display 914 provides a mechanism to display information to a user.

Instructions for at least one of the operating system, applications, or programs can be located in the storage devices 916, which are in communication with the processor unit 904 through the communications framework 902. The processes of the various examples and operations described herein can be performed by the processor unit 904 using computer-implemented instructions, which can be located in a memory, such as the memory 906.

The instructions are referred to as program code, computer usable program code, or computer readable program code (e.g., the instructions 180 shown in FIG. 1) that can be read and executed by a processor in processor unit 904 (e.g., the processor 102 shown in FIG. 1). The program code in the different examples can be embodied on different physical or computer readable storage media, such as the memory 906 or the persistent storage 908.

In one or more examples, application program code 918 is located in a functional form on computer readable media 920 that is selectively removable and can be loaded onto or transferred to the data processing system 900 for execution by the processor unit 904. The application program code 918 is an example of the instructions 180 (e.g., shown in FIG. 1). In one or more examples, the application program code 918 and computer readable media 920 form the computer program product 188. In one or more examples, the computer readable media 920 is computer readable storage media 924.

In one or more examples, the computer readable storage media 924 is a physical or tangible storage device used to store the application program code 918 rather than a medium that propagates or transmits the application program code 918.

Alternatively, the application program code 918 can be transferred to the data processing system 900 using a computer readable signal media. The computer readable signal media can be, for example, a propagated data signal containing the application program code 918. For example, the computer readable signal media can be at least one of an electromagnetic signal, an optical signal, or any other suitable type of signal. These signals can be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different examples can be implemented. The different examples can be implemented in a data processing system including components in addition to or in place of those illustrated for the data processing system 900. Other components shown in FIG. 12 can be varied from the examples shown. The different examples can be implemented using any hardware device or system capable of running the application program code 918.

Additionally, various components of the system 100 and/or the data processing system 900 of the computing device 182 may be described as modules. For the purpose of the present disclosure, the term "module" includes hardware, software or a combination of hardware and software. As an example, a module can include one or more circuits configured to perform or execute the described functions or operations of the executed processes described herein (e.g., the method 1000). As another example, a module includes a processor, a storage device (e.g., a memory), and computer-readable storage medium having instructions that, when executed by the processor causes the processor to perform or execute the described functions and operations. In one or more examples, a module takes the form of the program code 918 and the computer-readable media 920 together forming the computer program product 188.

Accordingly, examples of the disclosed method 1000, system 100, and program 188 provide various means for automated or semi-automated security log management and analysis, which further enable a system administrator to provide guidance related to proper defense against cybersecurity threats, attacks, and compromises. As an example, a supplier of the vehicle 108 (e.g., an aircraft manufacturer and/or supplier) can utilize examples of the method 1000, system 100, and program 188 to perform root cause analysis and provide follow-on guidance to vehicle operators (e.g., airlines). As another example, an operator of the vehicle 108 (e.g., an airline) can utilize the examples of the method 1000, system 100, and program 188 to perform root cause analysis and determine follow-on actions.

In an aerospace example, such as related to an e-Enabled aircraft, examples of the disclosed method 1000, system 100, and program 188 provide a unique "flight-based" signature analytical technique for cybersecurity attach and anomaly detection using the aircraft system log data. In such as flight-based technique, log behaviors are characterized and quantified on a per flight basis. In addition to log event types (e.g., episodes 122 and episode classifications 124) being defined, multiple flight-related factors, such as flight phases, airline, aircraft/fleet model, airport (e.g., departure and destination), region, communications method used, a number of devices connected to the onboard system 106, and the like can be integrated into the feature set 130 (e.g., select features 120 and metadata 194) to construct normal aircraft log profiles that are closely relevant to an aviation operation context.

Referring now to FIGS. 13 and 14, examples of the method 1000, system 100, and program 188 may be related to, or used in the context of, an aircraft manufacturing and service method 1100, as shown in the flow diagram of FIG. 13 and the aircraft 1200, as schematically illustrated in FIG. 14. For example, the aircraft 1200 and/or the aircraft production and service method 1100 may utilize implementations of the method 1000, the system 100, and the program 188 to profile and analyze aircraft activity logs for detection and cybersecurity threats and vulnerabilities.

Referring to FIG. 13, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 13 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the method 1000, the system 100, and the program 188 shown and described herein, may be employed during any one or more of the stages of the manufacturing and service method 1100 shown in the flow diagram illustrated by FIG. 13. In an example, implementations of the method 1000, the system 100, and the program 188 may form a portion of component and subassembly manufacturing (block 1106) and/or system integration (block 1108). Further, the method 1000, the system 100, and the program 188 may be implemented in a manner similar to components or subassemblies prepared while the aircraft 1200 is in service (block 1112). Also, implementations of the method 1000, the system 100, and the program 188 may be utilized during system integration (block 1108) and certification and delivery (block 1110). Similarly, implementations of the method 1000, the system 100, and the program 188 may be utilized, for example and without limitation, while the aircraft 1200 is in service (block 1112) and during maintenance and service (block 1114).

Further, the disclosure comprises embodiments according to the following clauses:

Clause 1. The system (100) for analyzing vehicle system logs, the system (100) comprising:
 a processor (102); and
 a storage device (104) comprising instructions (180), execution of which causes the processor (102) to:
  connect with an onboard system (106) of a vehicle (108), wherein the onboard system (106) is connectable to a network (110);
  collect an activity log (112) generated by the onboard system (106), wherein the activity log (112) comprises log messages (114) indicative of an activity (116) of the onboard system (106);
  extract a feature list (118) from the activity log (112), wherein the feature list (118) comprises features (120) and each one of the features (120) comprises select information from a corresponding one of the log messages (114);
  extract an episode (122) from the feature list (118), wherein the episode (122) is indicative of the activity (116) of the onboard system (106); and
  classify the episode (122) with an episode classification (124), wherein the episode classification (124) is indicative of an event (126) that occurred during the activity (116).

Clause 2. The system (100) according to Clause 1, wherein:
 the episode (122) is extracted from the feature list (118) according to a predetermined episode rule (128) that defines the episode (122) as a feature set (130) of the features (120) from the feature list (118); and
 the episode (122) is classified according to a predetermined classification rule (132) that defines the episode classification (124) as a number of times each one of the features (120) has occurred in the feature set (130).

Clause 3. The system (100) according to Clause 1 or 2, wherein:
 execution of the instructions (180) causes the processor (102) to generate the features (120) from the log messages (114); and
 each one of the features (120) comprises at least one field (134) expressed in the corresponding one of the log messages (114).

Clause 4. The system (100) according to Clause 3, wherein execution of the instructions (180) causes the processor (102) to generate a hierarchical tree (136) of the features (120) associated with the activity (116).

Clause 5. The system (100) according to Clause 2 or 3, wherein execution of the instructions (180) causes the processor (102) to:
generate a window (138) within the feature list (118) that includes a batch (140) of the features (120); and
search for the feature set (130) from the batch (140) of the features (120) in the window (138).

Clause 6. The system (100) according to Clause 5, wherein the window (138) is a time duration and is bound by a beginning (144) and an end (146).

Clause 7. The system (100) according to Clause 6, wherein execution of the instructions (180) causes the processor (102) to:
shift the window (138) within the feature list (118) by a time interval such that the window (138) includes a second batch (150) of the features (120); and
search for the feature set (130) from the second batch (150) of the features (120) in the window (138).

Clause 8. The system (100) according to any one of Clauses 5 to 7, wherein:
the window (138) is bound by a first one of the features (120) of the feature set (130) and a second one of the features (120) of the feature set (130);
the first one of the features (120) is indicative of a beginning (144) of the activity (116); and
the second one of the features (120) is indicative of an end (146) of the activity (116).

Clause 9. The system (100) according to any one of Clauses 1 to 8, wherein execution of the instructions (180) causes the processor (102) to generate a graphical display (152) representative of an occurrence of the episode classification (124) over a predetermined time period.

Clause 10. The system (100) according to any one of Clauses 1 to 9, wherein execution of the instructions (180) causes the processor (102) to compare an occurrence of the episode classification (124) to a predetermined occurrence threshold (154) over a predetermined time period.

Clause 11. The system (100) according to Clause 10, wherein execution of the instructions (180) causes the processor (102) to generate a recommended action (156) when the occurrence of the episode classification (124) is less than or greater than the predetermined occurrence threshold (154) over the predetermined time period.

Clause 12. The system (100) according to any one of Clauses 1 to 11, wherein execution of the instructions (180) causes the processor (102) to:
connect with a number of onboard systems (106) of the vehicle (108), wherein each one of the onboard systems (106) is connected to the network (110);
collect a number of activity logs (112) generated by the onboard systems (106), wherein the activity logs (112) comprise log messages (114) indicative of a number of activities (116) of the onboard systems (106);
extract the feature list (118) from the activity logs (112);
extract a number of episodes (122) from the feature list (118), wherein the episodes (122) are indicative of the activities (116) of the onboard systems (106); and
classify the episodes (122) with episode classifications (124), wherein the episode classifications (124) are indicative of events (126) that occurred during the activities (116).

Clause 13. The system (100) according to Clause 12, wherein execution of the instructions (180) causes the processor (102) to:
generate a graphical display (152) representative of an occurrence of each one of the episode classifications (124) over a predetermined time period; and
identify when an occurrence of any one of the episode classifications (124) is less than or greater than a predetermined occurrence threshold (154) over a predetermined time period.

Clause 14. The system (100) according to any one of Clauses 1 to 11, wherein execution of the instructions (180) causes the processor (102) to:
connect with a number of onboard systems (106) of a number of vehicles (108), wherein each one of the onboard systems (106) is connected to the network (110);
collect a number of activity logs (112) generated by the onboard systems (106), wherein the activity logs (112) comprise log messages (114) indicative of a number of activities (116) of the onboard systems (106);
extract the feature list (118) from the activity logs (112);
extract a number of episodes (122) from the feature list (118), wherein the episodes (122) are indicative of the activities (116) of the onboard systems (106); and
classify the episodes (122) with episode classifications (124), wherein the episode classifications (124) are indicative of events (126) that occurred during the activities (116).

Clause 15. The system (100) according to Clause 14, wherein execution of the instructions (180) causes the processor (102) to:
generate a graphical display (152) representative of an occurrence of each one of the episode classifications (124) associated with one of the episodes (122) for each one of the vehicles (108) over a predetermined time period; and identify when the occurrence of any one of the episode classifications (124) associated with one of the episodes (122) for any one of the vehicles (108) is greater than or less than a predetermined occurrence threshold (154) over a predetermined time period.

Clause 16. The method (1000) for analyzing vehicle system logs, the method (1000) comprising steps of:
connecting to an onboard system (106) of a vehicle (108), wherein the onboard system (106) is connectable to a network (110);
collecting an activity log (112) from the onboard system (106), wherein the activity log (112) comprises log messages (114) indicative of an activity (116) of the onboard system (106);
extracting a feature list (118) from the activity log (112), wherein the feature list (118) comprises features (120) and each one of the features (120) comprises select information from a corresponding one of the log messages (114);
extracting an episode (122) from the feature list (118), wherein the episode (122) is indicative of the activity (116) of the onboard system (106); and
classifying the episode (122) with an episode classification (124), wherein the episode classification (124) is indicative of an event (126) that occurred during the activity (116).

Clause 17. The method (1000) according to Clause 16, further comprising graphically representing an occurrence of the episode classification (124) over a predetermined time period.

Clause 18. The method (1000) according to Clause 16 or 17, further comprising:
- comparing an occurrence of the episode classification (124) to a predetermined occurrence threshold (154); and
- generating a recommended action (156) based on a comparison of the occurrence of the episode classification (124) to the predetermined occurrence threshold (156).

Clause 19. The non-transitory computer readable medium (920), comprising instructions (180) that cause a processor (102) to execute a process comprising:
- receiving an activity log (112) from an onboard system (106) of a vehicle (108), wherein the activity log (112) comprises log messages (114) indicative of an activity (116) of the onboard system (106);
- extracting a feature list (118) from the activity log (112), wherein the feature list (118) comprises features (120) and each one of the features (120) comprises select information from a corresponding one of the log messages (114);
- extracting an episode (122) from the feature list (118), wherein the episode (122) is indicative of the activity (116) of the onboard system (106); and
- classifying the episode (122) with an episode classification (124), wherein the episode classification (124) is indicative of an event (126) that occurred during the activity (116).

Clause 20. The non-transitory computer readable medium (920) according to Clause 19, wherein:
- the onboard system (106) is connectable to a network (110); and
- the process further comprises:
  - connecting to the onboard system (106) of the vehicle (108);
  - comparing an occurrence of the episode classification (124) to a predetermined occurrence threshold (154); and
  - generating a recommended action (156) based on a comparison of the occurrence of the episode classification (124) to the predetermined occurrence threshold (156).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

As used here, the symbol "N" refers to any natural number and, more specifically, to any positive integer.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

To the extent that terms "includes," "including," "has," "contains," "containing," and variants thereof are used herein, such terms are intended to be inclusive in a manner similar to the term "comprises" as an open transition word without precluding any additional or other elements.

FIGS. 2-12 and 14, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 2-12 and 14, referred to above, need be included in every example and not all elements, features, and/or components described herein are necessarily depicted in each illustrative example. Accordingly, some of the elements, features, and/or components described and illustrated in FIGS. 2-12 and 14 may be combined in various ways without the need to include other features described and illustrated in FIGS. 2-12 and 14, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 2-12 and 14, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 2-12 and 14, and such elements, features, and/or components may not be discussed in detail herein with reference to each of FIGS. 2-12 and 14. Similarly, all elements, features, and/or components may not be labeled in each of FIGS. 2-12 and 14, but reference numerals associated therewith may be utilized herein for consistency.

In FIGS. 1 and 13, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 1 and 13 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the method 1000, the system 100, and the program 188 have been shown and described, modifications may occur to those skilled in the art upon reading the specification. The present application includes such modifications and is limited only by the scope of the claims.

What is claimed is:

1. A system for analyzing vehicle system logs, the system comprising:
   a processor; and
   a storage device comprising instructions, execution of which causes the processor to:
   connect with an onboard system of a vehicle, wherein the onboard system is connectable to a network;
   collect an activity log generated by the onboard system, wherein the activity log comprises log messages indicative of an activity of the onboard system;
   extract a feature list from the activity log, wherein the feature list comprises features and each one of the features comprises a numerical feature identification and at least one field of text selected from a corresponding one of the log messages;
   generate a window within the feature list that includes a batch of the features;
   search for a set of features from the batch of the features in the window;
   extract an episode from the feature list, wherein the episode comprises the set of features selected from the window and is indicative of the activity of the onboard system;
   classify the episode with an episode classification, wherein the episode classification comprises a number of times each one of the features occurs in the set of features and is indicative of an event that occurred during the activity; and
   generate a recommended action based on a comparison of an occurrence of the episode classification to a predetermined occurrence threshold.

2. The system of claim 1, wherein:
   the episode is extracted from the feature list according to a predetermined episode rule that defines the episode as a pattern of the features in the set of features selected from the feature list; and
   the episode is classified according to a predetermined classification rule that defines the episode classification as a frequency or rate that the features occurred in the set of features.

3. The system of claim 1, wherein:
   execution of the instructions causes the processor to:
   generate the features from the log messages; and at least the one field of text from each one of the features comprises a time stamp and at least one of terms and values that represent semantic content embedded in the corresponding one of the log messages.

4. The system of claim 3, wherein execution of the instructions causes the processor to generate a hierarchical tree of the features associated with the activity.

5. The system of claim 1, wherein the window is a time duration and is bound by a beginning and an end.

6. The system of claim 5, wherein execution of the instructions causes the processor to:
shift the window within the feature list by a time interval such that the window includes a second batch of the features; and
search for the set of features from the second batch of the features in the window.

7. The system of claim 1, wherein:
the window is bound by a first one of the features of the set of features and a second one of the features of the set of features;
the first one of the features is indicative of a beginning of the activity; and
the second one of the features is indicative of an end of the activity.

8. The system of claim 1, wherein execution of the instructions causes the processor to generate a graphical display representative of an occurrence of the episode classification over a predetermined time period.

9. The system of claim 1, wherein execution of the instructions causes the processor to compare the occurrence of the episode classification to the predetermined occurrence threshold over a predetermined time period.

10. The system of claim 1, wherein:
the onboard system is one of a plurality of onboard systems of the vehicle, wherein each one of the onboard systems is connected to the network;
the activity log is one of a plurality of activity logs generated by the onboard systems, wherein the activity logs comprise log messages indicative of a number of activities of the onboard systems;
the feature list is extracted from the activity logs;
the episode is one of a plurality of episodes from the feature list, wherein the episodes are indicative of the activities of the onboard systems; and
the episode classification is one of a plurality of episode classifications, wherein the episode classifications are indicative of events that occurred during the activities.

11. The system of claim 10, wherein execution of the instructions causes the processor to:
generate a graphical display representative of an occurrence of each one of the episode classifications over a predetermined time period; and
identify when an occurrence of any one of the episode classifications is less than or greater than a predetermined occurrence threshold over a predetermined time period.

12. The system of claim 1, wherein:
the onboard system is one of a plurality of onboard systems of a plurality of vehicles, wherein each one of the onboard systems is connected to the network;
the activity log is one of a plurality of activity logs generated by the onboard systems, wherein the activity logs comprise log messages indicative of a number of activities of the onboard systems;
the feature list is extracted from the activity logs;
the episode is one of a plurality of episodes from the feature list, wherein the episodes are indicative of the activities of the onboard systems; and
the episode classification is one of a plurality of episode classifications, wherein the episode classifications are indicative of events that occurred during the activities.

13. The system of claim 12, wherein execution of the instructions causes the processor to:
generate a graphical display representative of an occurrence of each one of the episode classifications associated with one of the episodes for each one of the vehicles over a predetermined time period; and
identify when the occurrence of any one of the episode classifications associated with one of the episodes for any one of the vehicles is greater than or less than a predetermined occurrence threshold over a predetermined time period.

14. A method for analyzing vehicle system logs, the method comprising steps of:
connecting to an onboard system of a vehicle, wherein the onboard system is connectable to a network;
collecting an activity log from the onboard system, wherein the activity log comprises log messages indicative of an activity of the onboard system;
extracting a feature list from the activity log, wherein the feature list comprises features and each one of the features comprises a numerical feature identification and at least one filed of text from a corresponding one of the log messages;
generating a window within the feature list that includes a batch of the features;
searching for a set of features from the batch of the features in the window extracting an episode from the feature list, wherein the episode comprises the set of features selected from the window and is indicative of the activity of the onboard system;
classifying the episode with an episode classification, wherein the episode classification comprises a number of times each one of the features occurs in the set of features and is indicative of an event that occurred during the activity; and
generating a recommended action based on a comparison of an occurrence of the episode classification to a predetermined occurrence threshold.

15. The method of claim 14, further comprising graphically representing an occurrence of the episode classification over a predetermined time period.

16. The method of claim 14, further comprising:
comparing the occurrence of the episode classification to the predetermined occurrence threshold over a predetermined period of time; and
determining whether the occurrence of the episode classification is less than or greater than the predetermined occurrence threshold.

17. A non-transitory computer readable medium, comprising instructions that cause a processor to execute a process comprising:
receiving an activity log from an onboard system of a vehicle, wherein the activity log comprises log messages indicative of an activity of the onboard system;
extracting a feature list from the activity log, wherein the feature list comprises features and each one of the features comprises a numerical feature identification and at least one field of text selected from a corresponding one of the log messages;
generating a window within the feature list that includes a batch of the features;

searching for a set of features from the batch of the features in the window;

extracting an episode from the feature list, wherein the episode comprises the set of features selected from the window and is indicative of the activity of the onboard system;

classifying the episode with an episode classification, wherein the episode classification comprises a number of times each one of the features occurs in the set of features and is indicative of an event that occurred during the activity;

comparing an occurrence of the episode classification to a predetermined occurrence threshold; and generating a recommended action based on a comparison of the occurrence of the episode classification to the predetermined occurrence threshold.

18. The non-transitory computer readable medium of claim 17, wherein:

the onboard system is connectable to a network; and the process further comprises connecting to the onboard system of the vehicle.

19. The non-transitory computer readable medium of claim 17, wherein the process further comprises generating a graphical display representative of an occurrence of the episode classification over a predetermined time period.

20. The method of claim 14, further comprising:

shifting the window within the feature list by a time interval such that the window includes a second batch of the features; and searching for the set of features from the second batch of the features in the window.

* * * * *